US012652290B2

(12) United States Patent
Boyer et al.

(10) Patent No.: US 12,652,290 B2
(45) Date of Patent: Jun. 9, 2026

(54) CYBER SECURITY FOR SOFTWARE-AS-A-SERVICE FACTORING RISK

(71) Applicant: Darktrace Holdings Limited, Cambridge (GB)

(72) Inventors: John Anthony Boyer, Cambridge (GB); Clément Wen-Ho André Robin, Cambridgeshire (GB); Holly Louisa Birch, Cambridgeshire (GB)

(73) Assignee: Darktrace Holdings Limited, Cambridge (GB)

( * ) Notice: Subject to any disclaimer, the term of this patent is extended or adjusted under 35 U.S.C. 154(b) by 960 days.

(21) Appl. No.: 17/187,169

(22) Filed: Feb. 26, 2021

(65) Prior Publication Data

US 2021/0273957 A1 Sep. 2, 2021

Related U.S. Application Data

(60) Provisional application No. 63/078,092, filed on Sep. 14, 2020, provisional application No. 62/983,307, filed on Feb. 28, 2020.

(51) Int. Cl.
*H04L 9/00* (2022.01)
*H04L 9/40* (2022.01)
(Continued)

(52) U.S. Cl.
CPC ...... *H04L 63/1416* (2013.01); *H04L 63/1425* (2013.01); *H04L 63/1433* (2013.01);
(Continued)

(58) Field of Classification Search
CPC ............. H04L 63/1425; H04L 63/1433; H04L 63/1441
(Continued)

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

International Search Authority, The International Search Report and the Written Opinion of the International Searching Authority, or the Declaration, 156 pages.
(Continued)

*Primary Examiner* — Christopher J Brown
(74) *Attorney, Agent, or Firm* — Rutan and Tucker, LLP

(57) ABSTRACT

A cyber threat defense system can incorporate data from multiple Software-as-a-Service (SaaS) applications hosted by multiple third-party platforms to identify cyber threats across platforms. The system can collect third-party event data describing an administrative event of a SaaS application hosted by an associated third-party platform. The system can identify a user associated with the third-party event data based on a composite user profile constructed from user context data collected across the multiple SaaS applications to identify the user across multiple third-party platforms. The system can associate the user with a user risk profile based on the composite user profile. The system can identify whether the third-party event data corresponds to a cyber threat partially based on the user risk profile. The system can execute an autonomous response in response to the cyber threat using an autonomous response module factoring in the user risk profile.

19 Claims, 27 Drawing Sheets

(51) Int. Cl.
    *G06N 3/08*        (2023.01)
    *G06N 20/00*     (2019.01)
(52) U.S. Cl.
    CPC ............ H04L 63/1441 (2013.01); *G06N 3/08*
          (2013.01); *G06N 20/00* (2019.01); *H04L*
                               *63/145* (2013.01)
(58) Field of Classification Search
    USPC ........................................................ 726/23
    See application file for complete search history.

(56)               References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 7,890,869 | B1 | 2/2011 | Mayer et al. |
| 8,312,540 | B1 | 11/2012 | Kahn et al. |
| 8,661,538 | B2 | 2/2014 | Cohen-Ganor et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,348,742 | B1 | 5/2016 | Brezinski |
| 9,401,925 | B1 | 7/2016 | Guo et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmuell et al. |
| 9,727,723 | B1 | 8/2017 | Kondaveeti et al. |
| 10,237,298 | B1 | 3/2019 | Nguyen et al. |
| 10,268,821 | B2 | 4/2019 | Stockdale |
| 10,419,466 | B2 | 9/2019 | Ferguson |
| 10,516,693 | B2 | 12/2019 | Stockdale et al. |
| 10,701,093 | B2 | 6/2020 | Dean |
| 2002/0174217 | A1 | 11/2002 | Anderson et al. |
| 2002/0186698 | A1 | 12/2002 | Ceniza |
| 2003/0070003 | A1 | 4/2003 | Chong et al. |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2007/0118909 | A1 | 5/2007 | Hertzog et al. |
| 2007/0294187 | A1 | 12/2007 | Scherrer |
| 2008/0005137 | A1 | 1/2008 | Surendran et al. |
| 2008/0077358 | A1 | 3/2008 | Marvasti |
| 2008/0109730 | A1 | 5/2008 | Coffman et al. |
| 2009/0106174 | A1 | 4/2009 | Battisha et al. |
| 2009/0132395 | A1* | 5/2009 | Lam .................... G06F 16/9535 |
| | | | 705/30 |
| 2009/0254971 | A1 | 10/2009 | Herz et al. |
| 2010/0009357 | A1 | 1/2010 | Nevins et al. |
| 2010/0095374 | A1 | 4/2010 | Gillum et al. |
| 2010/0107254 | A1 | 4/2010 | Elland et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |

| | | | |
|---|---|---|---|
| 2014/0215618 | A1 | 7/2014 | Amit |
| 2014/0325643 | A1 | 10/2014 | Bart et al. |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0281287 | A1 | 10/2015 | Gill et al. |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0352768 | A1 | 12/2016 | Lefebvre et al. |
| 2016/0359695 | A1 | 12/2016 | Yadav et al. |
| 2016/0373476 | A1 | 12/2016 | Dell'Anno et al. |
| 2016/0373477 | A1 | 12/2016 | Moyle et al. |
| 2017/0054745 | A1 | 2/2017 | Zhang et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0118239 | A1* | 4/2017 | Most .................... H04L 63/168 |
| 2017/0169360 | A1 | 6/2017 | Veeramachaneni et al. |
| 2017/0270422 | A1 | 9/2017 | Sorakado |
| 2018/0027006 | A1 | 1/2018 | Zimmermann et al. |
| 2018/0167402 | A1 | 6/2018 | Scheidler et al. |
| 2018/0375886 | A1 | 12/2018 | Kirti et al. |
| 2019/0036948 | A1 | 1/2019 | Appel et al. |
| 2019/0044963 | A1 | 2/2019 | Rajasekharan et al. |
| 2019/0251260 | A1 | 8/2019 | Stockdale et al. |
| 2020/0090171 | A1* | 3/2020 | Bajpai .................. G06Q 30/018 |
| 2020/0244673 | A1 | 7/2020 | Stockdale |
| 2020/0259852 | A1* | 8/2020 | Wolff ...................... H04L 67/10 |
| 2020/0280575 | A1 | 9/2020 | Dean et al. |
| 2021/0120027 | A1 | 4/2021 | Dean et al. |
| 2021/0157919 | A1 | 5/2021 | Stockdale et al. |
| 2021/0194911 | A1* | 6/2021 | Hecht ................. H04L 63/1433 |
| 2021/0226982 | A1* | 7/2021 | Marty ................. H04L 63/1441 |
| 2021/0273958 | A1 | 9/2021 | McLean |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |
| WO | 2019243579 A1 | 12/2019 |
| WO | 2020021100 A1 | 1/2020 |

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
Marek Zachara et al., "Detecting Unusual User Behavior to Identify Hijacked Internet Auctions Accounts, " Lecture Notes in Computer Science, 2012, vol. 7465, Springer, Berlin, Heidelberg, Germany.
Gharan, Shayan Oveis, "Lecture 11; Clustering and the Spectral Partitioning Algorithm" May 2, 2016, 6 pages.
Nikolystylfw, "Can Senseon beat Darktrace at its very own game with its 'An I triangulation' modern technology?" Dec. 22, 2018, nikolystylfw.
Lunden, Ingrid, "Senseon raises $6.4M to tackle cybersecurity threats with an AI 'triangulation' approach" Feb. 19, 2019, Tech Crunch.

(56) References Cited

OTHER PUBLICATIONS

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology," * please see the statement filed herewith.

Senseon Tech Ltd., "Senseon & You," * please see the statement filed herewith.

Senseon Tech Ltd., "Technology Overview," * please see the statement filed herewith.

Senseon Tech Ltd., "Senseon Enterprise," * please see the statement filed herewith.

Senseon Tech Ltd., "Senseon Pro," * please see the statement filed herewith.

Senseon Tech Ltd., "Senseon Reflex," * please see the statement filed herewith.

European Patent Office, "Communication pursuant to Article 94(3) EPC," 7pp., Mar. 24, 2025.

* cited by examiner

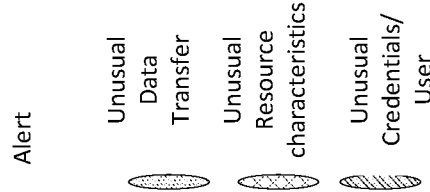
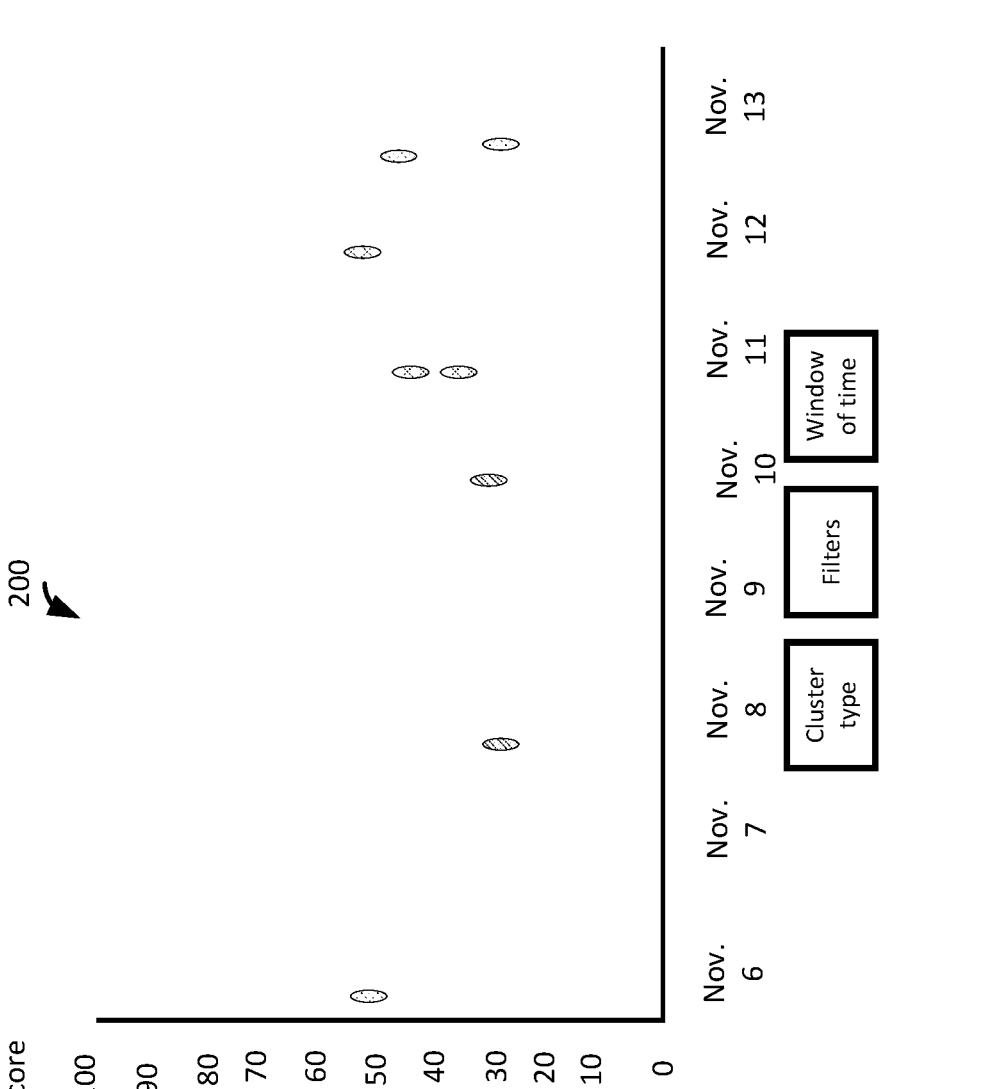
FIG. 2

Fig. 4

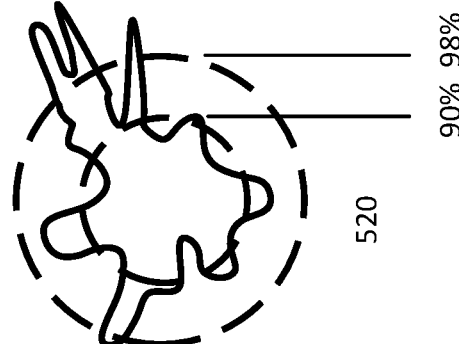
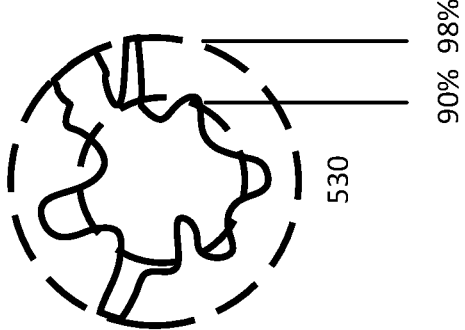
Fig. 5

| | |
|---|---|
| Login | 902 |
| Failed Login | 904 |
| Resource Creation | 906 |
| Resource View | 908 |
| Resource Modification | 910 |
| Resource Deletion | 912 |
| File Upload | 914 |
| File Download | 916 |
| Admin Action | 918 |

Fig. 9

Start

Receive Event Notification From 3rd Party Operator        1302

Place Even Notification In Quarantine        1304

Scan Event Notification For Deviant Characteristic        1306

Harvest Metadata From Event Notification        1308

Optionally Anonymize Metadata        1310

Fig. 13        End

| Threat Type | Confidence Score | Severity Score | User Risk Score |
|---|---|---|---|
| 1502 | 1504 | 1506 | 1508 |

Fig. 15

| Confidence Benchmark 1702 | Severity Benchmark 1704 | Consequence Benchmark 1706 |
|---|---|---|
| Confidence Weight 1708 | Severity Weight 1710 | Consequence Weight 1712 |

Fig. 17

| | |
|---|---|
| User Name | 2002 |
| Display Name | 2004 |
| Full Name | 2006 |
| Language | 2008 |
| Groups | 2010 |
| Job Title | 2012 |
| Roles | 2014 |
| Licenses Info | 2016 |
| Authorized Apps | 2018 |
| Registered Devices | 2020 |
| Permissions | 2022 |
| Access List | 2024 |
| Click Profile | 2026 |
| Platform Risk Assessment | 2028 |

Fig. 20

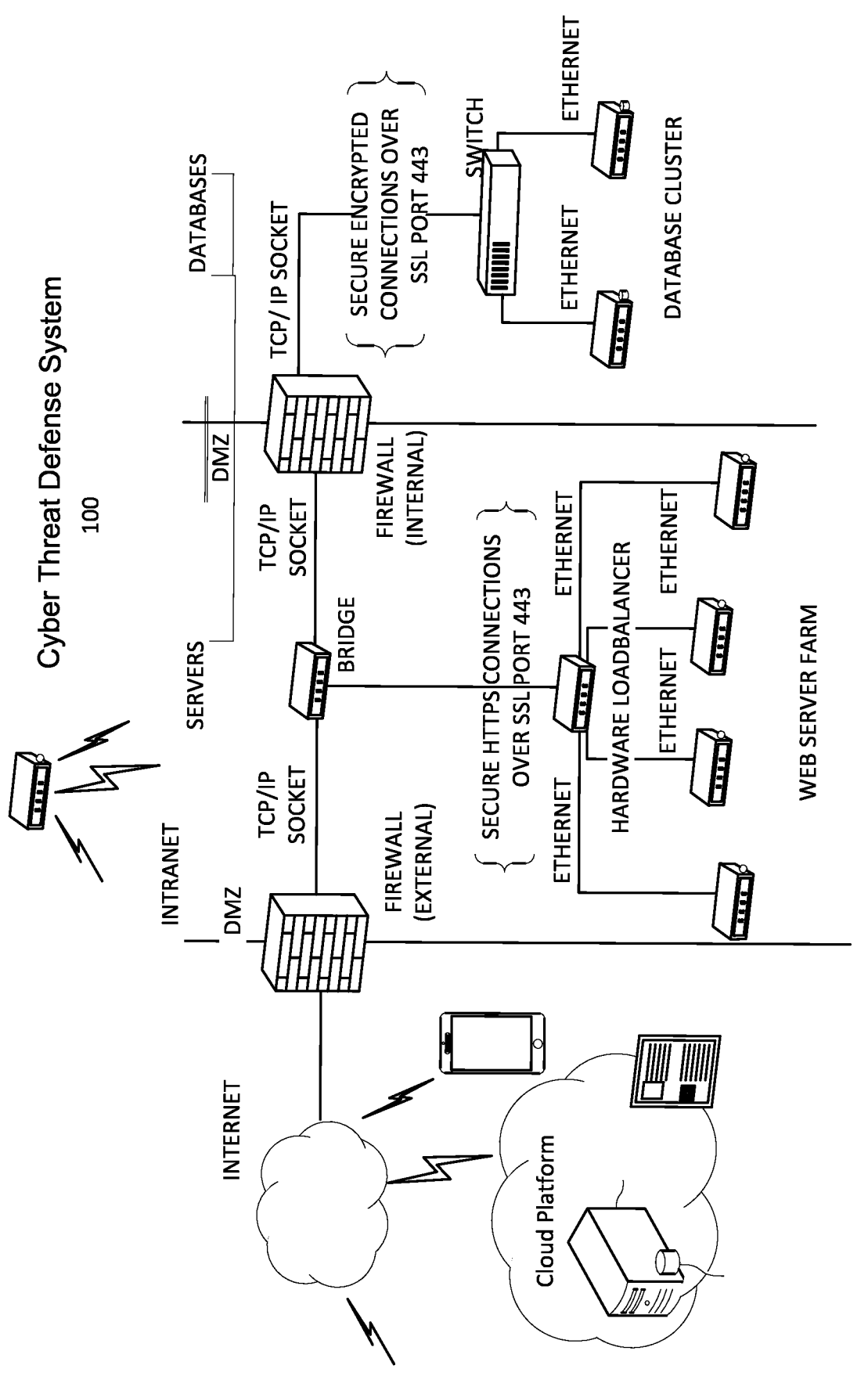
FIG. 27 Network

CYBER SECURITY FOR SOFTWARE-AS-A-SERVICE FACTORING RISK

RELATED APPLICATION

This application claims priority to and the benefit of under 35 USC 119 of U.S. provisional patent application titled "An Artificial Intelligence Based Cyber Security System," filed Feb. 28, 2020, Ser. No. 62/983,307, and U.S. provisional patent application titled "An Intelligent Cyber Security System," filed Sep. 14, 2020, Ser. No. 63/078,092, which is incorporated herein by reference in its entirety.

NOTICE OF COPYRIGHT

FIELD

Embodiments of the design provided herein generally relate to a cyber threat defense system. In an embodiment, a cyber threat defense system may incorporate data from a third-party Software-As-A-Service.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

Cyber threat, including email threats, viruses, Trojan horses, and worms, can subtly and rapidly cause harm to a network. Additionally, human users may wreak further damage to the system by malicious action. A cyber security system has to identify each of these cyber threats as they evolve.

SUMMARY

A cyber threat defense system can incorporate data from multiple Software-as-a-Service (SaaS) applications hosted by multiple third-party platforms to identify cyber threats across platforms. The system can collect third-party event data describing an administrative event of a SaaS application hosted by an associated third-party platform. The system can identify a user associated with the third-party event data based on a composite user profile constructed from user context data collected across the multiple SaaS applications to identify the user across multiple third-party platforms. The system can associate the user with a user risk profile based on the composite user profile. The system can identify whether the third-party event data corresponds to a cyber threat partially based on the user risk profile. The system can execute an autonomous response in response to the cyber threat using an autonomous response module factoring in the user risk profile.

These and other features of the design provided herein can be better understood with reference to the drawings, description, and claims, all of which form the disclosure of this patent application.

DRAWINGS

The drawings refer to some embodiments of the design provided herein in which:

FIG. 2 illustrates a block diagram of an embodiment of an example chain of unusual behavior for a network entity activity in connection with the rest of the network under analysis.

FIG. 4 illustrates in a block diagram of the integration of the threat detection system with other network protections.

FIG. 5 illustrates an application of a cyber threat defense system using advanced machine learning to detect anomalous behavior.

FIG. 9 illustrates third-party event data.

FIG. 15 illustrates a block diagram of a threat risk parameter.

FIG. 17 illustrates a block diagram of a benchmark matrix.

FIG. 20 illustrates in a block diagram user context data.

FIG. 27 illustrates an example network to be protected by the cyber threat defense system.

Figure 1:
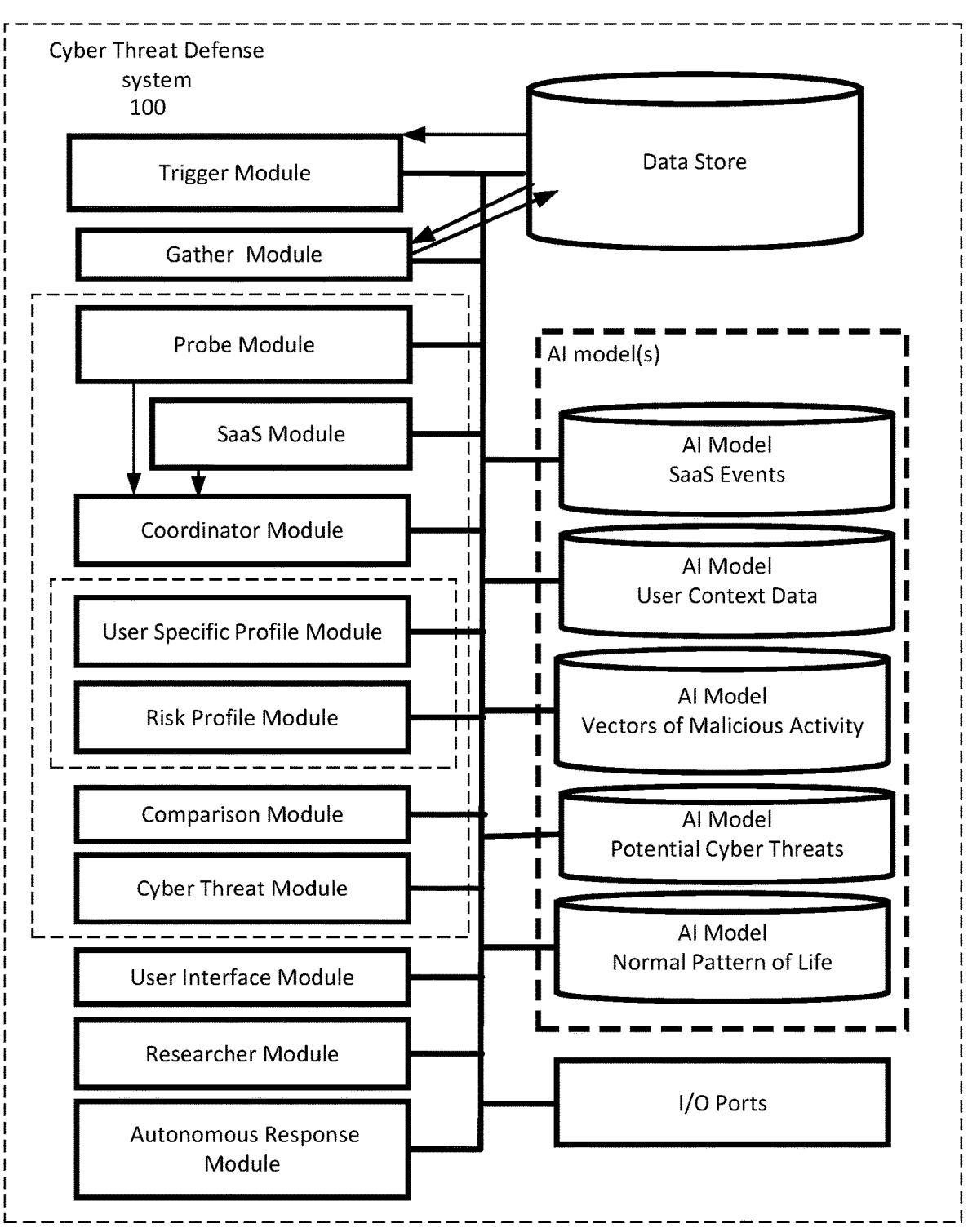
FIG. 1 illustrates a block diagram of an embodiment of a cyber threat defense system with a cyber threat module that references machine-learning models that are trained on the normal behavior of a network entity to identify cyber threats by identifying deviations from normal behavior.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber threat defense system may use artificial intelligence to analyze cyber security threats. The cyber threat defense system can incorporate data from a Software-as-a-Service (SaaS) application hosted by a third-party platform to identify cyber threats related to that SaaS application. The cyber threat defense system can collect data on one or more network entities (e.g. users, network devices, etc.) that utilize the SaaS application. The cyber threat defense system uses one or more machine-learning models trained on a normal benign behavior of each network entity that utilizes the SaaS application. The cyber threat defense system identifies whether a breach state and a chain of relevant behavioral parameters deviating from the normal benign behavior of that network entity correspond to a cyber threat. The cyber threat defense system executes one or more autonomous responses in response to the cyber threat using an autonomous response module.

FIG. 1 illustrates a block diagram of an embodiment of a cyber threat defense system with a cyber threat module that references machine learning models that are trained on the normal behavior of network activity and user activity associated with a network. The cyber threat module determines a threat risk parameter that factors in 'what is a likelihood of a chain of one or more unusual behaviors of SaaS activity, network activity, and user activity under analysis that fall outside of being a normal benign behavior;' and thus, are likely malicious behavior.

The cyber threat defense system 100 may protect against cyber security threats from a SaaS system as well as its network. The cyber threat defense system 100 may include components such as i) a trigger module, ii) a gather module, iii) a data store, iv) a probe module, v) a Software-As-A-Service (SaaS) module, vi) a coordinator module, vii) a user specific profile module, viii) a risk profile module, ix) a comparison module, x) a cyber threat module, xi) a user interface module, xii) a researcher module, xiii) an autonomous response module, xiv) at least one input or output (I/O) port to securely connect to other ports as required, xv) one or more machine learning models such as multiple Artificial Intelligence models trained on SaaS events and other SaaS activity for each specific SaaS application, multiple Artificial Intelligence models trained on user context data from each specific SaaS application, an Artificial Intelligence model trained on characteristics of vectors for malicious activity and related data, an Artificial Intelligence model trained on potential cyber threats, and one or more Artificial Intelligence models each trained on different users, devices, system activities and interactions between entities in the system, and other aspects of the system to develop a normal pattern of life, as well as xvi) other similar components in the cyber threat defense system.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the probe module monitoring network and email activity, the comparison module to apply one or more models trained on different aspects of this process, and the cyber threat module to identify cyber threats based on comparisons by the comparison module. Each hypothesis of typical threats can have various supporting points of data and other metrics associated with that possible threat, such as a human user insider attack, inappropriate network behavior, or email behavior or malicious software or malware attack, inappropriate network behavior, or SaaS behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data. In an embodiment, the probe module, the SaaS module, and the coordinator module may be portions of the cyber threat module.

A probe module can be configured to collect probe data from a probe deployed to a network entity. The network entity represents at least one of a user device and a network device interacting with the network. The probe data describes any activity executed by the network entity and administrated by a network administrator associated with the network. Such network-administrated activity would be external to any activity by the SaaS application executed by the network entity, which is hosted by a third-party platform. A network-administrated activity may be network activity or SaaS activity. Note, the probe module may be divided into an email module and a network module.

A cyber threat defense system can incorporate data from a Software-as-a-Service (SaaS) application administrated by a third-party operator to identify cyber threats related to that SaaS application. The cyber threat defense module can have a SaaS module to collect third-party event data from the third-party operator. The cyber threat defense system can have a comparison module to compare third-party event data for a network entity to at least one machine-learning model of a network entity using a normal behavior benchmark to spot behavior deviating from normal benign behavior. The comparison module can identify whether the network entity is in a breach state. The cyber threat defense system can have a cyber threat module to identify whether the breach state and a chain of relevant behavioral parameters correspond to a cyber threat. An autonomous response module can execute an autonomous response in response to the cyber threat. The autonomous response module, rather than a human taking an action, can be configured to cause one or more rapid autonomous actions to be taken to contain the cyber threat when the threat risk parameter from the cyber threat module is equal to or above an actionable threshold.

The cyber threat defense system can decide based upon the cyber threat detected that disabling the user account or device for a fixed period is the most appropriate and least disruptive method to suppress the action. Note, the cyber threat defense system is not limited to applying this method just on the specific platform where the threat was detected; the user may be disabled on all SaaS platforms, all distributed platforms (such as Cloud, Email, etc.) or disabled on the SaaS platform due to potentially malicious actions on the physical network. In stage 3 (730), instead of sending a reset (RST) packet, the connector sends an application programming interface (API) request to the SaaS product to modify the affected user and remove their permissions. The autonomous response module thus can log users out of their accounts, disable their accounts for a period of time, etc.

The cyber threat defense system can have one or more ports to connect to one or more probes monitoring multiple network devices that utilize third-party SaaS applications each hosted by a third-party platform. One or more SaaS modules can be configured to connect to one or more SaaS connectors. Each SaaS module can be configured to collect third-party event data describing an administrative event in a given third-party SaaS application. A context gatherer can be configured to at least one of actively request and passively receive the user context data from a first third-party platform via an application programming interface. One or more probe modules can be configured to collect, from the one or more probes, probe data describing network-administrated activity external to the given third-party SaaS application and executed by the user.

A SaaS module can be configured to collect third-party event data describing an administrative event of a SaaS application operating on a network entity for use in identifying a cyber threat, in conjunction with the probe module. Examples of a SaaS application may include Salesforce®, Microsoft 365®, Box®, Dropbox®, or Google Workspace®. A third-part operator may administrate the SaaS application. The cyber threat defense system can have a connector remotely installed on each network entity that utilizes the SaaS application. The at least one connector accesses the administrative event via the third-party platform. The SaaS module can connect to the connector via at least one input port. The cyber threat defense system can have a SaaS module for each SaaS application used by the users on the network.

The SaaS module may use a variety of approaches to retrieve data from a third-party platform. The connectors can be configured based on the specifications of the third-party platform. The connectors can be configured to access the administrative events using an application programming interface (API) interaction, accessing a SaaS application tool, or by making a Hypertext Transfer Protocol Secure (HTTPS) request. The SaaS application tool can be a user tool, an audit tool, or an event logging tool. For security purposes, the cyber threat defense system may prefer that the connectors control the data transfer. However, in some instances, the third-party platform may initiate the data transmission.

For example, the SaaS module can communicate with a connector to pull data from the third-party platform on an event-by-event basis. The SaaS module can be configured to direct at least one connector to request an administration event. The connector can request any administrative events on a cyclical basis, such as every 60 seconds. For security purposes, the connector can encode an event request according to a Hypertext Transfer Protocol Secure protocol before sending to the third-party platform administrating and hosting the SaaS application. The connector can then request third-party event data describing an administrative event. The third-party platform may provide the third-party event data to the connector. The connector forwards the third-party event data to an input port of the cyber threat defense system. The SaaS module then receives and processes the third-party event data. The SaaS module is configured to harvest metadata detailing any administrative events from the event report. The SaaS module is configured to anonymize the metadata to remove any personally identifiable information for the third-party platform from the metadata.

In another example, the SaaS module can communicate with a connector to pull data from the third-party platform on a less frequent basis. The SaaS module can be configured to direct at least one connector to request the third-party platform to generate an event report for a data rich description describing a series of administrative events. The SaaS module is configured to set a report period to specify a time frame for the even report. The SaaS module can direct the connector to request an application programming interface of the third-party platform to generate an event report. The connector can then request the third-party platform generate an event report over the report period. The third-party platform may provide the event report to the connector. The connector forwards the event report to an input port of the cyber threat defense system. The SaaS module then receives and processes the event report. The SaaS module is configured to harvest metadata from the data rich description. The SaaS module can be configured to anonymize the metadata to remove any personally identifiable information for the third-party platform or the network entity from the metadata. The SaaS module is configured to direct the connector to request the third-party platform delete the event report.

In a further example, the SaaS module can communicate with a connector to execute a delayed pull of the data from the third-party platform. The SaaS module can be configured to direct a connector to request an event notification describing the administrative event to be sent as a push notification upon occurrence of the administrative event. The SaaS module is configured to set a push period limiting when the push notification is accepted. The connector can generate a HTTPS request for a push notification describing an administrative event upon occurrence of that administrative event within the push period. The connector can then send the HTTPS request to a third-party platform of the SaaS application. The third-party platform may send the push notification to the connector. The connector forwards the push notification to an input port of the cyber threat defense system. The SaaS module then receives and processes the push notification. The SaaS module is configured to harvest metadata detailing the administrative event from the push notification. The SaaS module can be configured to anonymize the metadata to remove any personally identifiable information for the third-party platform or the network entity from the metadata.

In a further example, the SaaS module can receive, from a connector, third-party event data sent as a push notification initiated by the third-party platform. The third-party platform may send an administrative event as a push notification to the connector. The connector forwards the push notification to an input port of the cyber threat defense system. The SaaS module is configured to receive the event notification from the connector describing the administrative event as a push notification. The SaaS module is configured to place a push notification received from the at least one connector in a quarantine prior to analysis. The SaaS module is configured to scan a push notification while in quarantine for a deviant characteristic. The SaaS module is configured to harvest metadata detailing the administrative event from the push notification. The SaaS module can be configured to anonymize the metadata to remove any personally identifiable information for the third-party platform from the metadata.

Each SaaS module can be configured to connect to one or more SaaS connectors. Each SaaS module can be configured to collect third-party event data describing an administrative event in a third-party SaaS application. Each SaaS module can be configured to monitor a user instruction to a resource controlled by a SaaS application. Each SaaS module can be configured to register creation of a virtual device by the user on the third-party platform with a virtual device sensor. A user interface module can visually represent third-party event data in a graphical user interface.

Each SaaS module can have a context gather for the associated SaaS application. The context gatherer can collect user context data to identify a user from each third-party platform executing a SaaS application. The user context data can be a user name, a display name, a full name, a language setting, work group, a job title, a role, license information, an application authorization, a registered device, a permissions level, a file access list, a click profile describing tendency to click on suspicious links, or a platform user risk assessment performed on the user by a third-party platform operator.

The context gatherer can use the application programming interface for the SaaS application to request user context data from the third-party platform. The context gatherer can actively request the user context data from the third-party platform via an application programming interface. Additionally, the context gatherer can passively receive user context data from the third-party platform via the application programming interface.

The probe module monitoring network-administrated activity and the SaaS module monitoring SaaS applications may each feed their data to a coordinator module to correlate causal links between these activities to supply this input into the cyber threat module. The coordinator module can be configured to contextualize the third-party event data from the one or more SaaS modules with the probe data from the one or more probe modules to create a combined data set for analysis. The coordinator module can use a composite user profile to connect events from the different SaaS applications with events from the probe module.

A user specific profile module can construct a composite user profile to identify a user across multiple third-party platforms. The user specific profile module can construct a composite user profile describing the user based on user context data collected from multiple SaaS applications operated by multiple third-party platforms. The user specific profile module can associate the composite user profile with the third-party event data. The user specific profile module can match the user context data from the context gatherer with separate internal user context data from other context gatherers at internal service modules associated with other applications performed by the internal client network. The user specific profile module can match the user context data from the context gatherer with separate external user context data from other context gatherers at other SaaS modules associated with other SaaS applications operated by other third-party platforms. The user specific profile module can apply a fuzzy classifier to the user context data from the context gatherer to match with separate user context data. The user specific profile module can generate a confidence score for a match between the user context data from the context gatherer with separate user context data from other context gatherers at other application modules associated with other applications. The user specific profile module can adjust the confidence score based on third-party event data from one or more individual SaaS modules. The user specific profile module can confirm a user identity based on a comparison of the third-party event data to a user instruction.

A risk profile module can associate the user with a user risk profile based on the composite user profile. The risk profile module is configured to assign a user importance score to the user risk profile of the user based on the composite user profile to indicate a potential sphere of influence of the user. The potential sphere of influence refers to the number of services and resources that the user can affect. The risk profile module can assess the potential sphere of influence of the user based on at least one of administrative permissions, lateral movement, action persistence, and file access. Lateral movement refers to the ability of a user to move across services. Action persistence refers to the extent that an action by a user can allow that user to either remain in an environment undetected or shift to a new compromise method to remain in the network when detected. For an example of action persistence, a bad actor, acting as the user, can create an inbox rule that forwards all the user's emails to the bad actor in case the user's password is reset to kick the bad actor out of the user's inbox. In a further example of action persistence, a bad actor can have the ability to create new user accounts allowing them to login undetected.

The risk profile module can generate a vulnerability score based on the third-party event data describing the extent of changes a user can make to a file or resource. The risk profile module can factor the user importance score and the vulnerability score into the user risk profile to calculate a degree of damage. The risk profile module can adjust the normal behavior benchmark based on the user risk profile. The user specific profile module and the risk profile module may be combined into a risk preemptor module.

The cyber threat module may also use one or more machine-learning models trained on cyber threats in the network. The cyber threat module may reference the models that are trained on the normal behavior of user activity, network activity, and SaaS activity associated with the network. The cyber threat module can reference these various trained machine-learning models and data from the probe module, the SaaS module, and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, is malicious behavior.

The one or more machine learning models can be self-learning models using unsupervised learning and trained on a normal behavior of different aspects of the system, for example, device activity and user activity associated with a SaaS application. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. The at least one machine-learning model is trained on a normal benign behavior of a network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber threat defense system 100 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The cyber threat defense system 100 may also include one or more machine learning models trained on gaining an understanding of a plurality of characteristics on a SaaS administrative event and related data including classifying the properties of the SaaS administrative event and its meta data.

The cyber threat module can also reference the machine learning models trained on a SaaS administrative event and related data to determine if a SaaS administrative event or a series of SaaS administrative events under analysis have potentially malicious characteristics. The cyber threat module can also factor this SaaS administrative event characteristics analysis into its determination of the threat risk parameter. The cyber threat module can generate a set of incident data describing an anomalous event by an entity, here representing a user or a device participating in the network. The cyber threat module can use the incident data to determine whether the anomalous event indicates a breach state representing a malicious incident or confidential data exposure. To do this, the cyber threat module can use the user interface and display module to present the incident data to a user analyst for review. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails.

The cyber threat defense system 100 may supplement the data provided to the users and cyber professionals using a researcher module. The researcher module operates an artificial intelligence (AI) algorithm to assess whether the anomalous network activity has previously appeared in other published threat research or known lists of malicious files or internet addresses. The researcher module can consult internal threat databases or external public sources of threat data. The researcher module can collect an outside data set describing at least one of an action or a state related to the cyber threat present outside of the network from at least one data source outside the network.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The autonomous response module can interact with the SaaS module and the cyber threat module to automatically respond to any issues with a SaaS application. The cyber threat module may analyze the third-party event data from a third-party platform administrating and hosting the SaaS application to identify any cyber threats. The cyber threat module may generate a threat risk parameter listing a set of values describing aspects of a potential cyber threat. The autonomous response module is configured to compare the threat risk parameter to a benchmark matrix having a set of benchmark scores to determine an autonomous response. The autonomous response module is configured to identify at least one autonomous response to take in response to the cyber threat based on the threat risk parameter. A connector may query a third-party platform administrating and hosting the SaaS application to discover available responses to a cyber threat, such as suspension of user accounts or curtailing user privileges. The SaaS module may collect those responses from the connector to provide to the autonomous response module.

The autonomous response module may tag a specific user to have a lower threshold for an autonomous response, depending on the circumstances of the cyber threat. For example, a chief financial officer can cause much damage to a company by making financial transactions to embezzle funds. If the cyber threat module identifies a cyber threat of a financial nature, the autonomous response module can lower a threshold for the autonomous response upon identifying a tagged user associated with the cyber threat. The autonomous response module can simultaneously employ a number of different clustering methods including matrix-based clustering, density based clustering, and hierarchical clustering techniques to identify which users to tag with which threat type.

The cyber threat defense system 100 may be hosted on a device, on one or more servers, or in its own cyber threat appliance platform.

FIG. 2 illustrates a block diagram of an embodiment of an example chain of unusual behavior for the network entity in connection with the rest of the network under analysis.

The user interface can display a graph 200 of an example chain of unusual behavior for a SaaS application in connection with the rest of the network under analysis.

The cyber threat module cooperates with one or more machine learning models. The one or more machine learning models are trained and otherwise configured with mathematical algorithms to infer, for the cyber threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network entity, such as a network, a system, a device, a user, or an email, under analysis by the cyber threat module and the machine learning models. The cyber defense system uses unusual behavior deviating from the normal behavior and then builds a chain of unusual behavior and the causal links between the chain of unusual behavior to detect cyber threats. An example behavioral pattern analysis of what are the unusual behaviors may be as follows. The unusual pattern may be determined by filtering out what activities, events, or alerts that fall within the window of what is the normal pattern of life for that network entity under analysis. Then the pattern of the behavior of the activities, events, or alerts that are left, after the filtering, can be analyzed to determine whether that pattern is indicative of a behavior of a malicious actor, such as a human, a program, an email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in the interaction with the SaaS application in the monitored system three times which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three interactions with the SaaS application with unusual characteristics. When the behavioral pattern analysis of any individual behavior or of the chain as a group is believed to be indicative of a malicious threat, then a score of how confident the defense system is in this assessment of identifying whether the unusual pattern was caused by a malicious actor is created. Next, also assigned is a threat level parameter (e.g. score or probability) indicative of what level of threat does this malicious actor pose to the system. Lastly, the cyber threat defense system is configurable in its user interface of the defense system on what type of automatic response actions, if any, the defense system may take when for different types of cyber threats that are equal to or above a configurable level of threat posed by this malicious actor.

The cyber threat module may chain the individual alerts and events that form the unusual pattern into a distinct item for cyber threat analysis of that chain of distinct alerts or events. The cyber threat module may reference the one or more machine learning models trained on SaaS application threats to identify similar characteristics from the individual alerts or events forming the distinct item made up of the chain of alerts or events forming the unusual pattern.

One or more machine learning models may also be trained on characteristics and aspects of all manner of types of cyber threats to analyze the threat risk associated with the chain or cluster of alerts or events forming the unusual pattern. The machine learning technology, using advanced mathematics, can detect previously unidentified threats, without relying on prescribed rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived each producing time series data for the given metric.

The detectors in the cyber threat module, including the probe module and SaaS module components, can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the third-party SaaS interactions, iii) coming from specific devices and/or users within a system, etc.

At its core, the cyber threat defense system mathematically characterizes what constitutes 'normal' behavior based on the analysis of a large number/set of different measures of a devices network behavior. The cyber threat defense system can build a sophisticated 'pattern of life'—that understands what represents normality for every person, device, email activity, SaaS activity, and network activity in the system being protected by the cyber threat defense system.

As discussed, each machine learning model may be trained on specific aspects of the normal pattern of life for the system such as devices, users, network traffic flow, outputs from one or more cyber security analysis tools analyzing the system, email contact associations for each user, email characteristics, SaaS activity, and others. The one or more machine learning models may use at least unsupervised learning algorithms to establish what is the normal pattern of life for the system. The machine learning models can train on both i) the historical normal distribution of alerts and events for that system and ii) a normal distribution information from similar peer systems to establish the normal pattern of life of the behavior of alerts or events for that system. Another set of machine learning models train on characteristics of the SaaS application and the activities and behavior of the SaaS application users to establish a normal behavior for these.

The models can leverage at least two different approaches to detecting anomalies: such as comparing each system's behavior to its own history and comparing that system to its peers' history or such as comparing SaaS application's normal operations to both characteristics of the SaaS application and the activities and behavior of its SaaS users. This multiple source comparison allows the models to avoid learning existing bad behavior as 'a normal behavior', because compromised entities, such as devices, users, components, emails will exhibit behavior different to their immediate peers.

In addition, the one or more machine learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

The plotting and comparison are a way to filter out what is normal for that system and then be able to focus the analysis on what is abnormal or unusual for that system. Then for each hypothesis of what could be happening with the chain of unusual events or alerts, the gather module may gather additional metrics from the data store including the pool of metrics originally considered 'normal behavior' to support or refute each possible hypothesis of what could be happening with this chain of unusual behavior under analysis.

Note, each of the individual alerts or events in a chain of alerts or events that form the unusual pattern can indicate subtle abnormal behavior. Thus, each alert or event can have a low threat risk associated with that individual alert or event. However, when analyzed as a distinct chain or grouping of alerts or events behavior forming the chain of unusual pattern by the one or more machine learning models, that distinct chain of alerts or events can be determined to now have a much higher threat risk than any of the individual and/or events in the chain.

In addition, modern cyber attacks can be of such severity and speed that a human response cannot happen quickly enough. Thanks to these self-learning advances, a machine may uncover these emerging threats and deploy appropriate, real-time responses to fight back against the most serious cyber threats.

The threat detection system can self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, SaaS application, and human activity behaviorally, at and after the point of compromise, in order to predict and catch today's increasingly sophisticated cyber-attack vectors. It is thus possible to computationally establish what is normal, in order to then detect what is abnormal. In addition, the machine learning constantly revisits assumptions about behavior, using probabilistic mathematics. The cyber threat defense system's unsupervised machine learning methods do not require training data with pre-defined labels. Instead, unsupervised machine learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns. These similarities of events or alerts in the chain may be, for example, alerts or events are coming from same device, same user credentials, same group, same source identifiers, same destination Internet Protocol addresses, same types of data transfers, same type of unusual activity, same type of alerts, same rare connection being made, same type of events, or others, so that a human can visually see what spatially and content-wise is making up a particular chain rather than merely viewing a textual log of data. Note, once the human mind visually sees the projected pattern and corresponding data, then the human can ultimately decide if a cyber threat is posed. Again, the at least three-dimensional projection helps a human synthesize this information more easily. The visualization onto the user interface allows a human to see data that supports or refutes why the cyber threat defense system thinks these aggregated alerts or events could be potentially malicious. Also, instead of generating the simple binary outputs 'malicious' or 'benign,' the cyber threat defense system's mathematical algorithms produce outputs that indicate differing degrees of potential compromise.

Defense System

Figure 3:
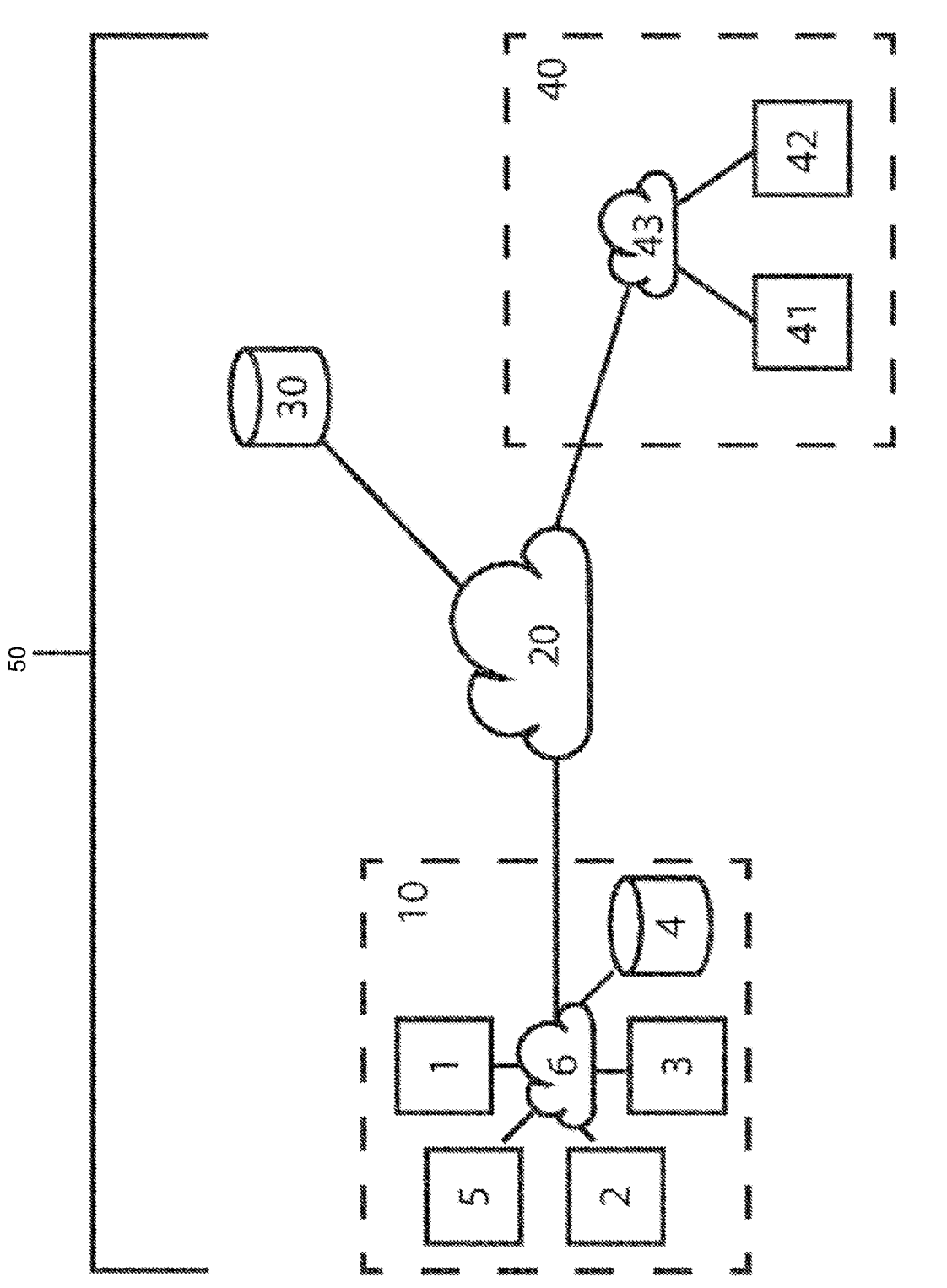
FIG. 3 illustrates an example cyber threat defense system protecting an example network.

FIG. 3 illustrates an example cyber threat defense system protecting an example network. The example network FIG. 3 illustrates a network of computer systems 50 using a threat detection system. The system depicted by FIG. 3 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a local area network (LAN) 6. Consequently, all the computers 1, 2, 3 can access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 3.

The computer 1 builds and maintains a dynamic, ever-changing model of the 'normal behavior' of each user and machine within the system 10. The approach is based on Bayesian mathematics, and monitors all interactions, events, and communications within the system 10—which computer is talking to which, files that have been created, networks that are being accessed.

For example, computer 2 is based in a company's San Francisco office and operated by a marketing employee who regularly accesses the marketing network. Computer 2 is active from about 8:30 AM until 6 PM and usually communicates with machines in the company's U.K. office in second computer system 40 between 9.30 AM and midday. The same employee virtually never accesses the employee time sheets, very rarely connects to the company's Atlanta network, and has no dealings in South-East Asia. The threat detection system takes all the information that is available relating to this employee to establish a 'pattern of life' for that person, which is dynamically updated as more information is gathered. The 'normal' model is used as a moving benchmark, allowing the system to spot behavior on a system that seems to fall outside of this normal pattern of life and to flag this behavior as anomalous, requiring further investigation.

The threat detection system is built to deal with the fact that today's attackers are getting stealthier. An attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, to defeat a relatively-simple policing process. These sophisticated attackers look for activity that is not directly associated with the user's input. As an Advanced Persistent Threat (APT) attack typically has very long mission windows of weeks, months, or years, such processor cycles can be stolen so infrequently that they do not impact machine performance. However cloaked and sophisticated the attack is, the attack will always leave a measurable delta, even if extremely slight, in typical machine behavior, between pre and post compromise. This behavioral delta can be observed and acted on with the form of Bayesian mathematical analysis used by the threat detection system installed on the computer 1.

Figure 4:
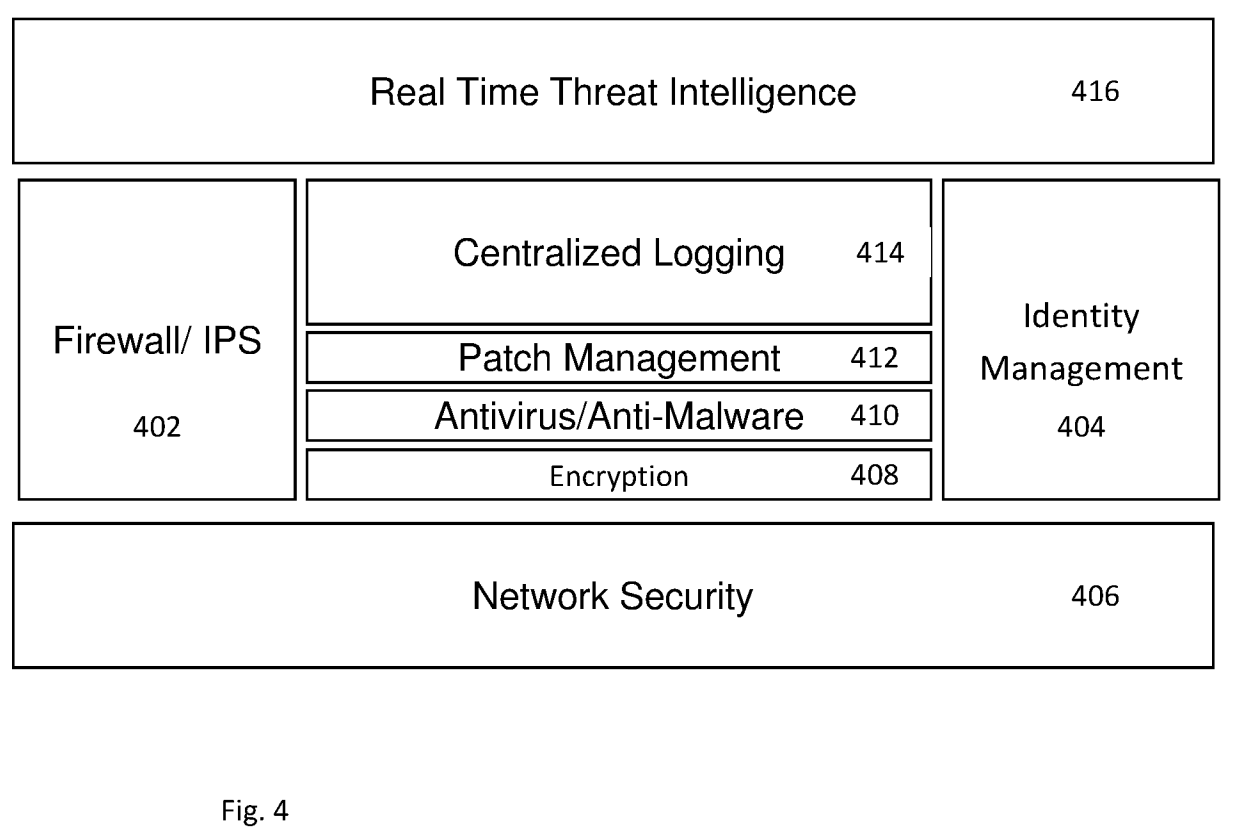

FIG. 4 illustrates in a block diagram the integration of the threat detection system with other network protections. A network generally has a firewall 402 as a first line of defense. The firewall 402 analyzes packet headers on incoming network data packets to enforce network policy. The firewall 402 may be integrated with an intrusion prevention system (IPS) to analyze the packet header and payload for whole events. Internally, an identity management module 404 controls the access for the users of the network.

A network security module 406 can enforce practices and policies for the network as determined by a network administrator. An encryption module 408 can encrypt communications within the network, as well as encrypting and decrypting communications between network entities and outside entities. An anti-virus or anti-malware module 410 may search packets for known viruses and malware. A patch management module 412 can ensure that security applications within the network have applied the most up-to-date patches. A centralized logging module 414 may track communications both internal to and interactive with the network. The threat detection system can act as real time threat intelligence 416 for the network. The real time threat intelligence may interact with the other defense components to protect the network.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system may self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

This intelligent system may make value judgments and carry out higher value, more thoughtful tasks. Machine learning requires complex algorithms to be devised and an overarching framework to interpret the results produced.

However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches. For example, the machine learning learns what is normal within a network without depending upon knowledge of previous attacks. The machine learning thrives on the scale, complexity, and diversity of modern businesses, where every device and person is slightly different. The machine learning turns the innovation of attackers against them, so that any unusual activity is visible. The machine learning constantly revisits assumptions about behavior, using probabilistic mathematics. The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

FIG. 5 illustrates an application of a cyber threat defense system using advanced machine learning to detect anomalous behavior. A normal pattern of behavior 510 may describe a set of user or device behavior within a threshold level of occurrence, such as a 98% probability of occurrence based on prior behavior. An anomalous activity 520 may describe a set of user or device behavior that is above the threshold level of occurrence. The cyber threat defense system can initiate an autonomous response 530 to counteract the anomalous activity, leaving the normal behavior unaffected.

Machine learning can approximate some human capabilities to machines. Machine learning can approximate thought by using past information and insights to form judgments. Machine learning can act in real time so that the system processes information as it goes. Machine learning can self-improve by constantly challenging and adapting the model's machine learning understanding based on new information.

New unsupervised machine learning therefore allows computers to recognize evolving threats, without prior warning or supervision.

Unsupervised Machine Learning

Unsupervised learning works things out without predefined labels. This allows the system to handle the unexpected and embrace uncertainty. The system does not always know the characteristics of the target of the search but can independently classify data and detect compelling patterns.

The cyber threat defense system's unsupervised machine learning methods do not require training data with predefined labels. Instead, unsupervised machine learning methods can identify key patterns and trends in the data, without the need for human input. Unsupervised learning provides the advantage of allowing computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, the cyber threat defense system may independently classify data and detect compelling patterns that define what may be considered to be normal behavior. Any new behaviors that deviate from this notion of 'normality' may indicate threat or compromise. The impact of the cyber threat defense system's unsupervised machine learning on cyber security is transformative. Threats from within, which would otherwise go undetected, can be spotted, highlighted, contextually prioritized, and isolated using these algorithms. The application of machine learning has the potential to provide total network visibility and far greater detection levels, ensuring that networks have an internal defense mechanism. Machine learning has the capability to learn when to execute automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, the cyber threat defense system's probabilistic approach to cyber security is based on a Bayesian framework. This allows the cyber threat defense system to integrate a huge number of weak indicators of potentially anomalous network behavior to produce a single clear measure of how likely a network device is to be compromised. This probabilistic mathematical approach provides an ability to understand important information amid the noise of the network, even when the target of a search is unknown.

Ranking Threats

Crucially, the cyber threat defense system's approach accounts for the inevitable ambiguities that exist in data, distinguishing between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner, prioritizing those that most urgently require action and simultaneously removing the problem of numerous false positives associated with a rule-based approach.

On a core level, the cyber threat defense system mathematically characterizes what constitutes 'normal' behavior based on the analysis of a large number of different measures of network behavior by a device. Such network behavior may include server access, data access, timings of events, credential use, domain name server (DNS) requests, and other similar parameters. Each measure of network behavior is then monitored in real time to detect anomalous behaviors.

Clustering

To be able to properly model what should be considered as normal for a device, the behavior of the device must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix-based clustering, density based clustering, and hierarchical clustering techniques. The resulting clusters are then used to inform the modeling of the normative behaviors of individual devices. Clustering analyzes behavior in the context of other similar devices on the network. Clustering algorithms identify naturally occurring groupings of devices, which is impossible to do manually. Further, the cyber threat defense system may simultaneously run multiple different clustering methods to inform the models.

Network Topology

Any cyber threat detection system must also recognize that a network is far more than the sum of its individual parts, with much of its meaning contained in the relationships among its different entities. Plus, any cyber threat defense system must further recognize that complex threats can often induce subtle changes in this network structure. To capture such threats, the cyber threat defense system employs several different mathematical methods in order to be able to model multiple facets of a network topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise local area network (LAN), wide area network (WAN) and Cloud is difficult because both input and output can contain many interrelated features, such as protocols, source and destination machines, log changes, rule triggers, and others. Learning a sparse and consistent structured predictive function is crucial to avoid over fitting.

In this context, the cyber threat defense system has employed a cutting edge large-scale computational approach to learn sparse structure in models of network behavior and connectivity based on applying L1-regularization techniques, such as a Least Absolute Shrinkage and Selection Operator (LASSO) method. This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models can constantly adapt themselves, in a computationally efficient manner, as new information becomes available to the system. They continually recalculate threat levels in the light of new evidence, identifying changing attack behaviors where conventional signature-based methods fail.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that can identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but rather are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Figure 6:
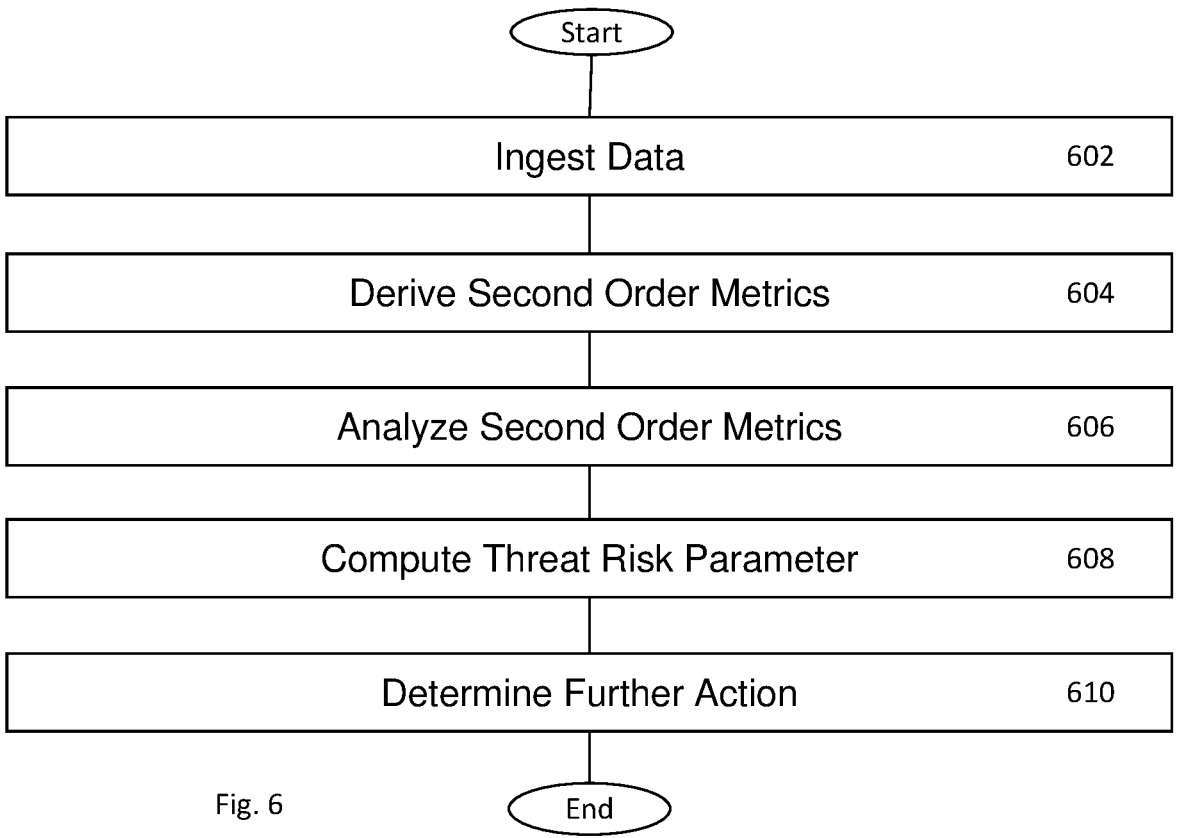
FIG. 6 illustrates a flowchart of an embodiment of a method for modeling human, machine, or other activity.

FIG. 6 illustrates a flowchart of an embodiment of a method for modeling human, machine or other activity. The cyber threat defense system initially ingests data from multiple sources (Block 602). The raw data sources include, but are not limited to raw network Internet Protocol (IP) traffic captured from an IP or other network Test Access Points (TAP) or Switched Port Analyzer (SPAN) port; machine generated log files; connectors and sensors specifically designed for SaaS applications, building access ("swipe card") systems; IP or non-IP data flowing over an Industrial Control System (ICS) distributed network; individual machine, peripheral or component power usage; telecommunication signal strength; or machine level performance data taken from on-host sources, such as central processing unit (CPU) usage, memory usage, disk usage, disk free space, network usage, and others.

The cyber threat defense system derives second order metrics from that raw data (Block 604). From these raw sources of data, multiple metrics can be derived, each producing time series data for the given metric. The data are bucketed into individual time slices. For example, the number observed could be counted per 1 second, per 10 seconds or per 60 seconds. These buckets can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (such as 120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, the cyber threat defense system commonly obtains multiple metrics relating to a wide range of potential threats. Communications from components in the network contacting known suspect domains.

The actual specific metrics used are largely irrelevant to the Bayesian probabilistic system, as long as a metric is selected. Metrics derived from network traffic could include data such as the number of bytes of data entering or leaving a networked device per time interval, file access, the commonality or rarity of a communications process, an invalid secure-sockets layer (SSL) certification, a failed authorization attempt, or email access patterns.

In the case where transmission control protocol (TCP), user datagram protocol (UDP), or other Transport Layer IP protocols are used over the IP network, and in cases where alternative Internet Layer protocols are used, such as Internet Control Message Protocol (ICMP) or Internet Group Message Protocol (IGMP), knowledge of the structure of the protocol in use and basic packet header analysis can be utilized to generate further metrics. Such further metrics may include the number of multicasts per time interval originating from a networked device and intended to reach publicly addressable IP ranges, the number of internal link-local IP Broadcast requests originating from a networked device, the size of the packet payload data, or the number of individual TCP connections made by a device, or data transferred by a device, either as a combined total across all destinations or to any definable target network range, such as a single target machine or a specific network range.

In the case of IP traffic where the Application Layer protocol can be determined and analyzed, further types of time series metric can be defined. These time series metrics may include, for example, the number of DNS requests a networked device generates per time interval, again either to any definable target network range or in total; the number of Simple Mail Transfer Protocol (SMTP), Post Office Protocol (POP) or Internet Message Access Protocol (IMAP) logins or login failures a machine generates per time interval; the number of Lightweight Directory Access Protocol (LDAP) logins or login failures generated; data transferred via file sharing protocols such as Server Message Block (SMB), SMB2, File Transfer Protocol (FTP), or others; or logins to Microsoft Windows Active Directory, Secure Shell (SSH) or Local Logins to Linux or Unix-like systems, or other authenticated systems such as Kerberos.

The raw data required to obtain these metrics may be collected via a passive fiber or copper connection to the networks internal switch gear, from virtual switching implementations, cloud-based systems, or communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data sets are extremely sparse, with most data points equal to 0. Examples would be employee's using swipe cards to access a building or part of a building, or user's logging into their workstation, authenticated by Microsoft Windows Active Directory Server, which is typically performed a small number of times per day. Other time series data sets are much more populated, such as, the size of data moving to or from an always-on Web Server, the Web Servers CPU utilization, or the power usage of a photocopier.

Regardless of the type of data, such time series data sets, whether originally produced as the result of explicit human behavior or an automated computer or other system to exhibit periodicity, have the tendency for various patterns within the data to recur at approximately regular intervals. Furthermore, such data may have many distinct but independent regular time periods apparent within the time series.

Detectors carry out analysis of the second order metrics (Block 606). Detectors are discrete mathematical models that implement a specific mathematical method against different sets of variables with the target network. For example, Hidden Markov Models (HMM) may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes may be value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

The threat detection system computes a threat risk parameter indicative of a likelihood of there being a threat using automated adaptive periodicity detection mapped onto observed behavioral pattern-of-life analysis (Block 608). This deduces that a threat over time exists from a collected set of attributes that themselves have shown deviation from normative collective or individual behavior. The automated adaptive periodicity detection uses the period of time the Bayesian probabilistic has computed to be most relevant within the observed network or machines. Furthermore, the pattern of life analysis identifies how a human or machine behaves over time, such as when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning or Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of, for example, a laptop. If the attack escalates, the cyber threat defense system may ultimately quarantine a device to prevent wider harm to an organization.

In order to improve the accuracy of the system, a check can be carried out in order to compare current behavior of a user with associated users, such as users within a single office. For example, if there is an unexpectedly low level of activity from a user, this may not be due to unusual activity from the user, but rather a factor affecting the office as a whole. Various other factors can be considered in order to assess whether abnormal behavior is actually indicative of a threat.

Finally, the cyber threat defense system determines, based on the threat risk parameter, as to whether further action need be taken regarding the threat (Block 610). A human operator may make this determination after being presented with a probability of there being a threat. Alternately, an algorithm may make the determination, such as by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection can scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network, and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured input/output problems, such as the observation of packet traffic and host activity within a distributed digital enterprise, where both input and output can contain tens of thousands to millions of interrelated features (data transport, host-web-client dialogue, log change and rule trigger, etc.), learning a sparse and consistent structured predictive function is challenged by a lack of normal distribution. To overcome this, the threat detection system comprises a data structure that decides on a rolling continuum rather than a stepwise method in which recurring time cycles, such as the working day, shift patterns, and other routines are dynamically assigned, thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product.

For the computer program product, a transitory computer readable medium may include radio or other carrier waves.

An apparatus such as a computer may be configured in accordance with such code to perform one or more processes in accordance with the various methods discussed herein.

Integrating Software-as-a-Service

A Software-as-a-Service (SaaS) application licenses a software application to a user on a periodic basis, such as Microsoft 365, Salesforce.com, Dropbox.com, Box.com and the Google Workspace. The added benefit of these applications is that the SaaS developer centrally hosts the functions of the application. The SaaS application can leverage this centralized hosting to expand the functionality of the SaaS application beyond the capabilities of a single user device. However, as the hosting is controlled by a third-party, the centralized hosting renders accessing performance data more difficult. Unlike with a cloud service, a third-party platform monitors and controls any traffic with the SaaS application, preventing a cyber threat defense system from directly monitoring the network traffic. However, the cyber threat defense system can access an appropriate behavioral data application programming interface (API) to access logs that expose every action that occurs within the SAAS environment. Thus, the cyber threat defense system, using a self-learning attack detection system, can operate across the entirety of an on-premise or cloud digital networks, as well as across any SaaS facilities used in an organization. Thus, the cyber threat defense system can access all the computing, networks and devices that can be found in company properties, as well as rented cloud facilities and SaaS services.

Using the cyber threat module, the cyber threat defense system learns the normal "pattern of life" of all communications-network-connected elements of an on-premise and remote digital ecosystem. Further, the cyber threat defense system can use a SaaS module to learn the interactions of the user with data and services within the SaaS services, referred to as administrative events. For example, the SaaS module can detect when a user reads a file, shares a file, starts a server, deletes a server, sends an email, and other actions. Once "normal behavior" has been learned, the cyber threat defense system is capable of identifying unexpected or unusual behaviors from devices, software, or operators of devices and SaaS services.

Such unusual behavior might be a result of misconfiguration, accidental use, malicious use by a legitimate operator, or malicious use by a third-party. The SaaS immune system has no prior assumptions and is capable of learning about the behavior of any device or person in on-premise environments, remote environments, and even third-party environments. The cyber threat defense system uses many different machine learning and artificial intelligence techniques that compete to learn the best possible pattern of life for individual devices or people, as well as subsets of their behavior.

The cyber threat defense system can learn the similarities of behavior in groups of people and devices. The cyber threat defense system can cluster these groups to develop a baseline of "normal behavior" across the group. The cyber threat defense system can then recognize when a person or device is in the cluster is deviating from this "normal behavior".

The cyber threat defense system recognizes associated chains of behaviors. For example, an attack begins by subverting a public relations officer's laptop in a corporate environment. The attack spreads to computer systems in the procurement division. The procurement division is able to access customer information in the SaaS environment. The attack spreads into this SaaS arena. The attack begins to manipulate the data in the SaaS environment with the potential for deliberate harm. All stages of this attack can be identified by the cyber threat defense system and presented together in context to a security professional at both the home network and the SaaS environment.

The cyber threat defense system can present its summarized findings and enable further human investigation into the unusual behavior to determine whether this behavior represents an actual attack of even a damaging user error. The cyber threat defense system can autonomously respond to the unusual behavior, if an attack is indicated, in an automatic way that prevents the attack from progressing further. For example, the autonomous response module of the cyber threat defense system can mandate that no more SaaS activities can successfully occur until a human has verified that the unusual behavior is allowed or should be blocked indefinitely.

In an embodiment, the cyber threat defense system is configured to operate across the entirety of the "SaaS" environment and traditional computing mechanisms in an organization. For example, the cyber threat defense system can incorporate the oversight of data accesses, data sharing, and data changes in third-party hosted SaaS applications, such as Salesforce®, Dropbox®, Microsoft 365®, as well as the traditional corporate facilities found in offices and datacenters.

Figure 7:
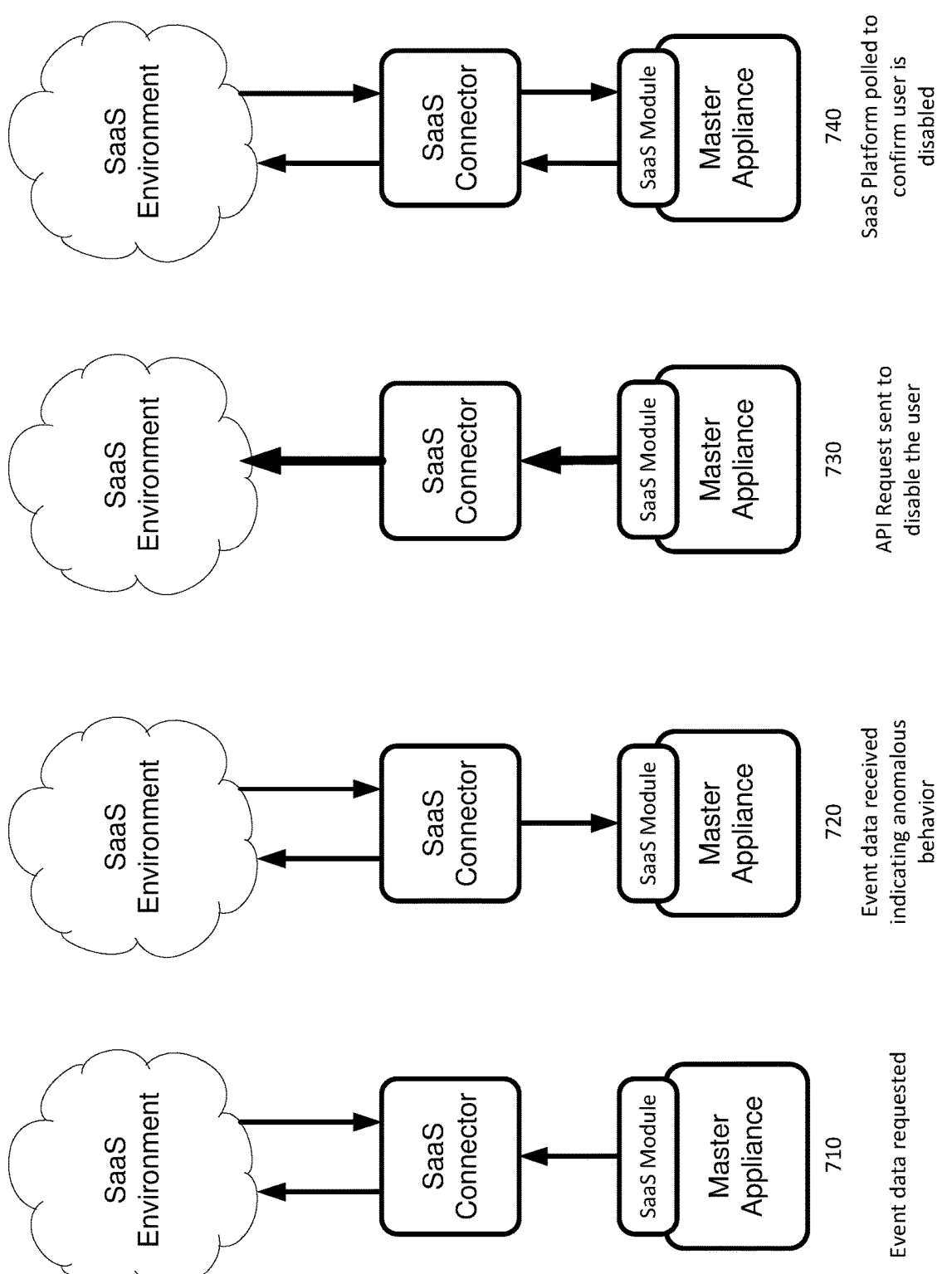
FIG. 7 illustrates in a block diagram a cyber threat defense system interacting with a Software-as-a-Service (SaaS) application.

FIG. 7 illustrates in a block diagram a cyber threat defense system interacting with a SaaS application. The cyber threat defense system may use a connector to collect data and provide autonomous responses to a SaaS product being used by a network entity, such as Salesforce®, Dropbox®, or Microsoft 365®. A network entity represents a user or a network device that is interacting with a network. In stage 1 (710) of a threat identification, the connector polls the SaaS product for administrative events. The SaaS product returns third-party event data describing a set of administrative events. The connector may pass any anomalous administrative events to the cyber threat defense system. The cyber threat defense system can identify whether the network entity is in a breach state of a benchmark representing normal behavior based on the third-party event data. The breach state can indicate a cyber threat.

In stage 2 (720), the cyber threat defense system can decide to disable the user account or device for a fixed period to suppress the action. In stage 3 (730), instead of sending a reset (RST) packet, the connector sends an application programming interface (API) request to the SaaS product to perform that action. In stage 4 (740), the SaaS product halts the user action.

Figure 8:
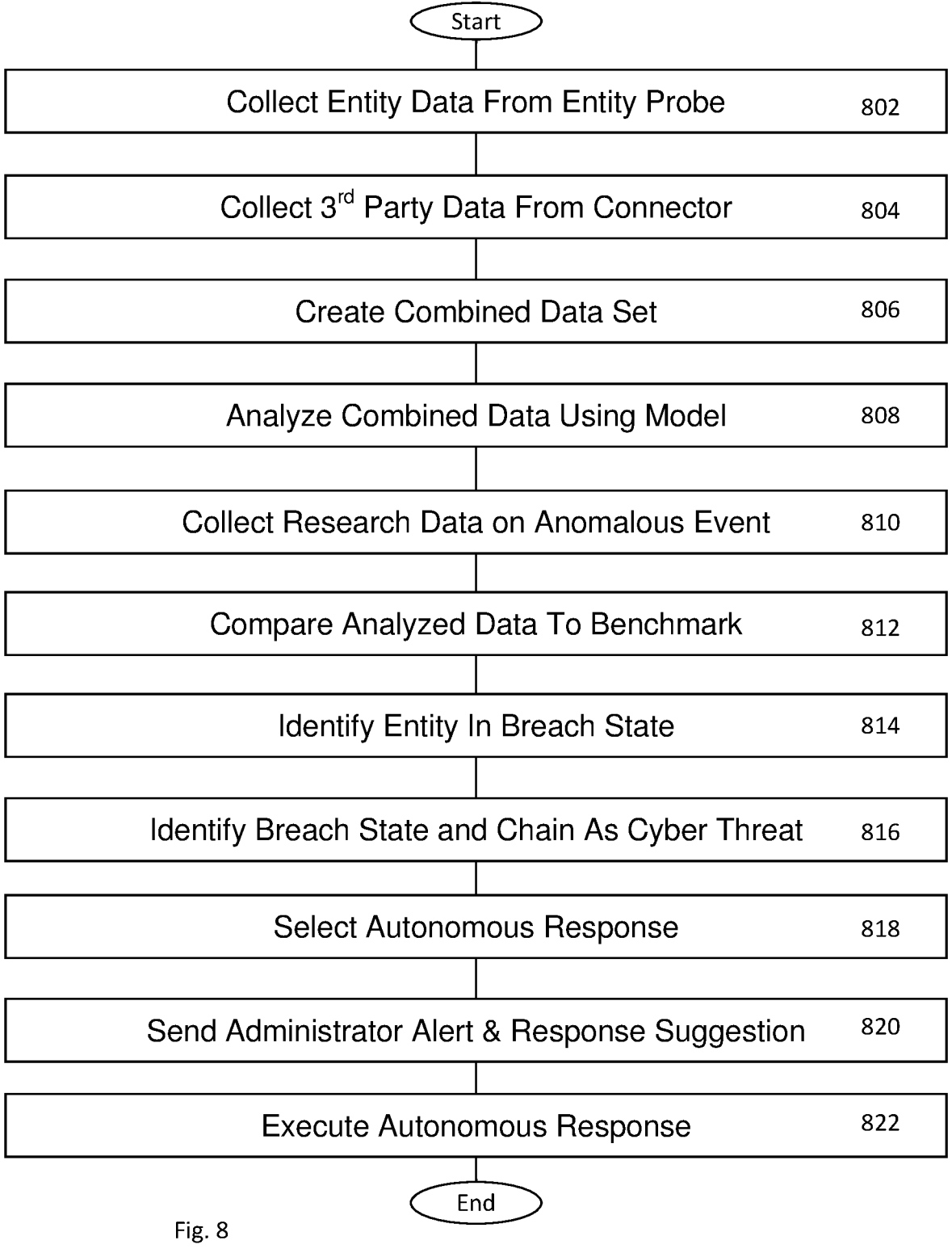
FIG. 8 illustrates a flowchart of an embodiment of a method for identifying a cyber threat from SaaS data.

FIG. 8 illustrates a flowchart of an embodiment of a method for identifying an anomalous event from SaaS data. The cyber threat defense system can use one or more probe modules configured to collect probe data from one or more probes monitoring multiple network devices that utilize third-party SaaS applications each hosted by a third party platform (Block 802). The probe data describes network-administrated activity, external to the SaaS application, by the network entity. The one or more probe modules can collect, from the one or more probes, probe data describing network-administrated activity, external to a particular third-party SaaS application, executed by the user.

The cyber threat defense system can use a SaaS module configured to collect third-party event data from one or more connectors (Block 804). A connector collects data from a network entity that utilizes a third-party software-as-a-service application. A third-party platform administrates the third-party software-as-a-service application. The third-party event data describes an administrative event of the third-party software-as-a-service application.

The cyber threat defense system uses a coordinator module to contextualize the third-party event data from the SaaS module with the probe data from the probe module to create a combined data set for analysis (Block 806). The cyber threat defense system uses a cyber threat module configured to analyze the combined data set using at least one machine-learning model to spot behavior on the network deviating from the normal benign behavior (Block 808). The at least one machine-learning model trains on a normal benign behavior of a network entity. The at least one machine-learning model uses a normal behavior benchmark as a benchmark of at least one parameter corresponding to a normal pattern of activity for the network to spot deviant behavior.

The cyber threat defense system has a researcher module configured to collect an outside data set describing at least one of an outside action and an outside state related to the third-party event data from at least one data source outside the network (Block 810). The cyber threat defense system has a comparison module that compares the combined data set, including the third-party event data, to the at least one machine-learning model to spot behavior on the network deviating from a normal benign behavior of that network entity (Block 812). The comparison module can identify whether the network entity is in a breach state of the normal behavior benchmark (Block 814). The cyber threat module can identify whether the breach state and a chain of relevant behavioral parameters deviating from the normal benign behavior of that network entity correspond to a cyber threat (Block 816).

The cyber threat defense system can use an autonomous response module configured to select an autonomous response to take in response to the cyber threat (Block 818). The autonomous response can be, for example, reducing permissions of the network entity or disabling a user account of the network entity. The autonomous response module can send an alert of the cyber threat with a suggested response to the cyber threat to an internal system administrator or the third-party platform (Block 820). The autonomous response module can execute the autonomous response in response to the cyber threat (Block 822).

FIG. 9 illustrates third-party event data. The third-party event data may represent a variety of administrative events. The administrative event can be a login event 902 describing the user logging in to a user account for the SaaS application. The administrative event can be a failed login event 904 describing the failure of a user to log in to a user account for the SaaS application. The administrative event can be a resource creation event 906 describing the creation of a virtual instance of the SaaS application. The administrative event can be a resource view event 908 describing a viewing of a virtual instance of the SaaS application. The administrative event can be a resource modification event 910 describing the modification of a virtual instance of the SaaS application. The administrative event can be a resource deletion event 912 describing the deletion of a virtual instance of the SaaS application. The administrative event can be a file upload event 914 describing the uploading of a file to the SaaS application. The administrative event can be a file download event 916 describing the downloading of a file from the SaaS application. The administrative event can be an administrative action event 918 describing an action at the administrative level to the SaaS application.

Figure 10:
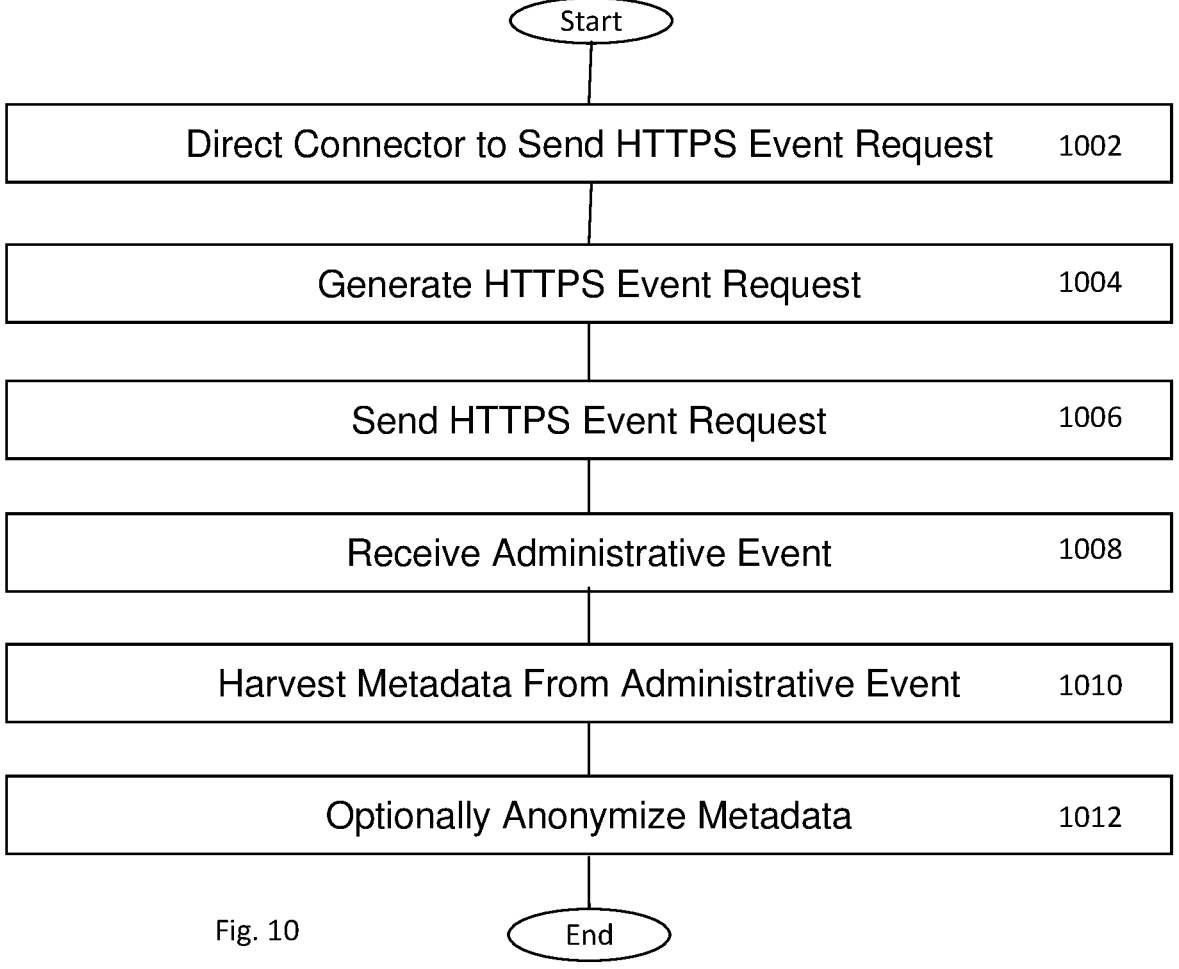
FIG. 10 illustrates a flowchart of an embodiment of a method for pulling data from a SaaS application.

The cyber threat defense system can use a variety of methods to retrieve administrative events. The SaaS module can pull the administrative events from the third-party platform on an event-by-event basis. FIG. 10 illustrates a flowchart of an embodiment of a method for pulling data from a SaaS application. The SaaS module is configured to direct one or more connectors to send a Hypertext Transfer Protocol Secure (HTTPS) event request to the third-party SaaS application (Block 1002). The HTTPS event request asks for an administrative event from an audit log of the third-party SaaS application. The one or more connectors generate the HTTPS event request (Block 1004). The one or more connectors send the HTTPS event request to a third-party platform administrating and hosting the third-party SaaS application to request the administrative event (Block 1006). The SaaS module is configured to receive an administrative event from the one or more connectors in response to the event request (Block 1008). The SaaS module is configured to harvest metadata of the administrative event (Block 1010). The SaaS module can be configured to optionally anonymize the metadata to remove any personally identifiable information for the third-party platform and the network entity from the metadata (Block 1012).

Figure 11:
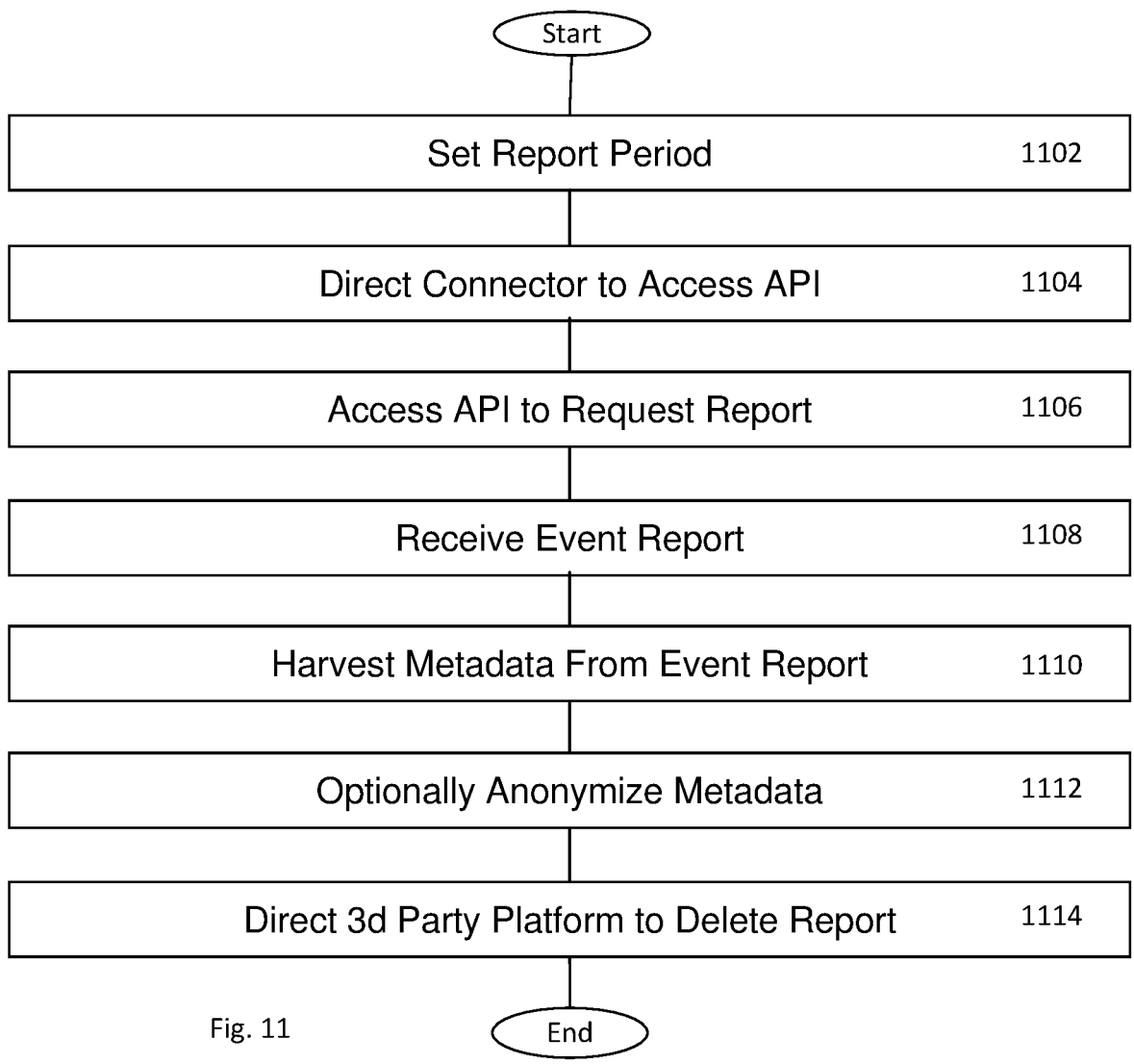
FIG. 11 illustrates a flowchart of an embodiment of a method for requesting a data report from a SaaS application.

The SaaS module can request an event report from the third-party platform detailing a series of administrative events over a report period. FIG. 11 illustrates a flowchart of an embodiment of a method for requesting an event report from a SaaS application. The SaaS module is configured to a report period to specify a time frame for an event report describing administrative events (Block 1102). The SaaS module is configured to direct one or more connectors to request an event report for a data rich description describing a series of (Block 1104). The one or more connectors access an application programming interface of the third-party platform to generate the event report (Block 1106). The SaaS module is configured to receive the event report from the at least one connector in response to the report request (Block 1108). The SaaS module is configured to harvest metadata from the data rich description of the event report (Block 1110). The SaaS module can be configured to optionally anonymize the metadata to remove any personally identifiable information for the third-party platform and the network entity from the metadata (Block 1112). The SaaS module is configured to direct the one or more connectors to request the third-party platform to delete the event report after harvesting (Block 1114).

Figure 12:
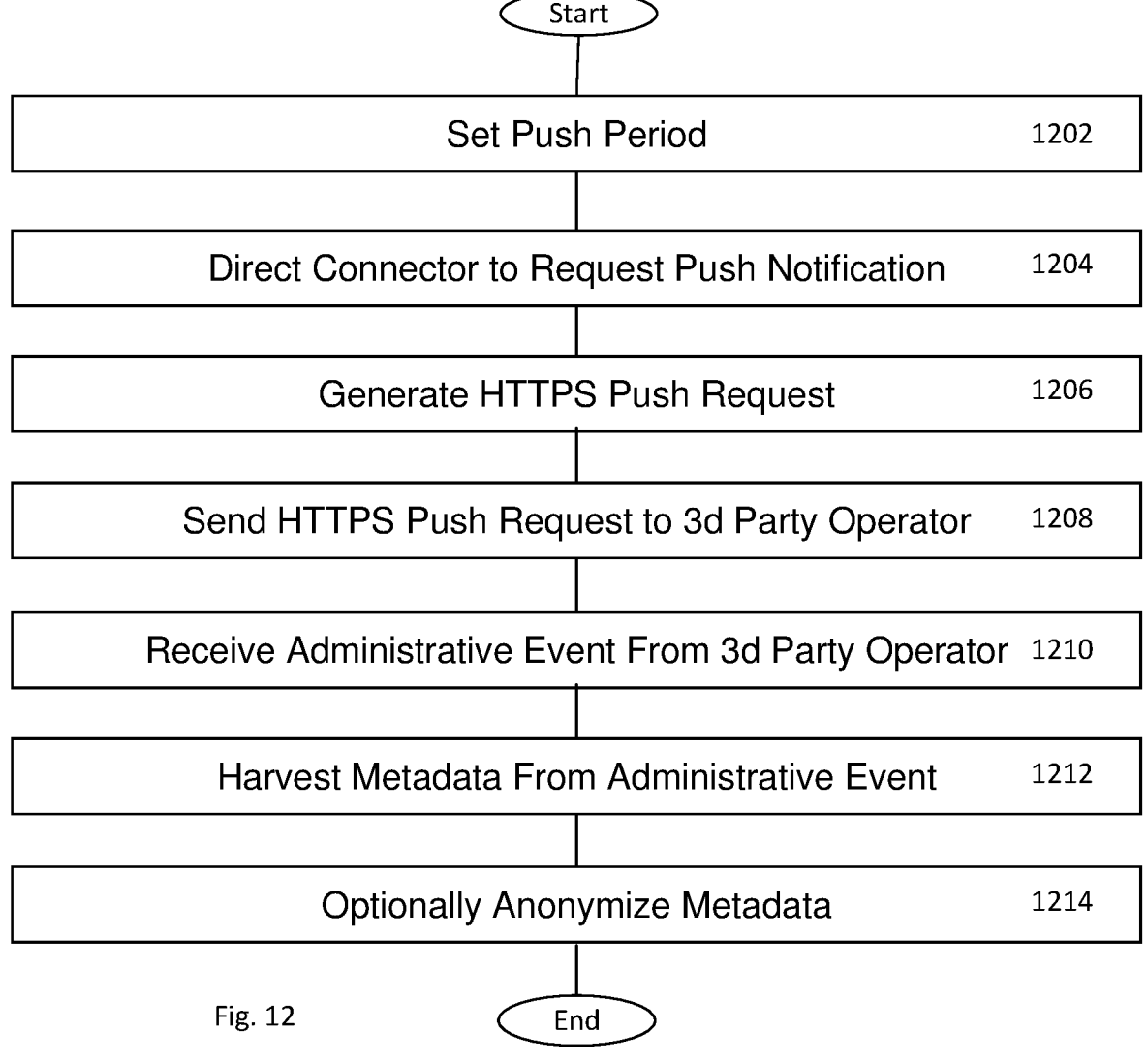
FIG. 12 illustrates a flowchart of an embodiment of a method for executing a delayed data pull from a SaaS application.

The SaaS module can execute a delayed pull of administrative events, receiving administrative events from the third-party platform as the administrative events occur. FIG. 12 illustrates a flowchart of an embodiment of a method for executing a delayed data pull from a SaaS application. The SaaS module is configured to set a push period to limiting when a push notification is accepted (Block 1202). The SaaS module is configured to direct the one or more connectors to request an event notification describing the administrative event to be sent as a push notification upon occurrence of the administrative event (Block 1204). The one or more connectors generate a HTTPS push request for an administrative event from an audit log of the third-party SaaS application when that administrative event occurs (Block 1206). The one or more connectors send the HTTPS push request to a third-party platform administrating and hosting the third-party SaaS application (Block 1208). The SaaS module is configured to receive an event notification from the one or more connectors describing the administrative event as a push notification (Block 1210). The SaaS module is configured to harvest metadata of the administrative event (Block 1212). The SaaS module can be configured to optionally anonymize the metadata to remove any personally identifiable information for the third-party platform and the network entity from the metadata (Block 1214).

Figure 13:
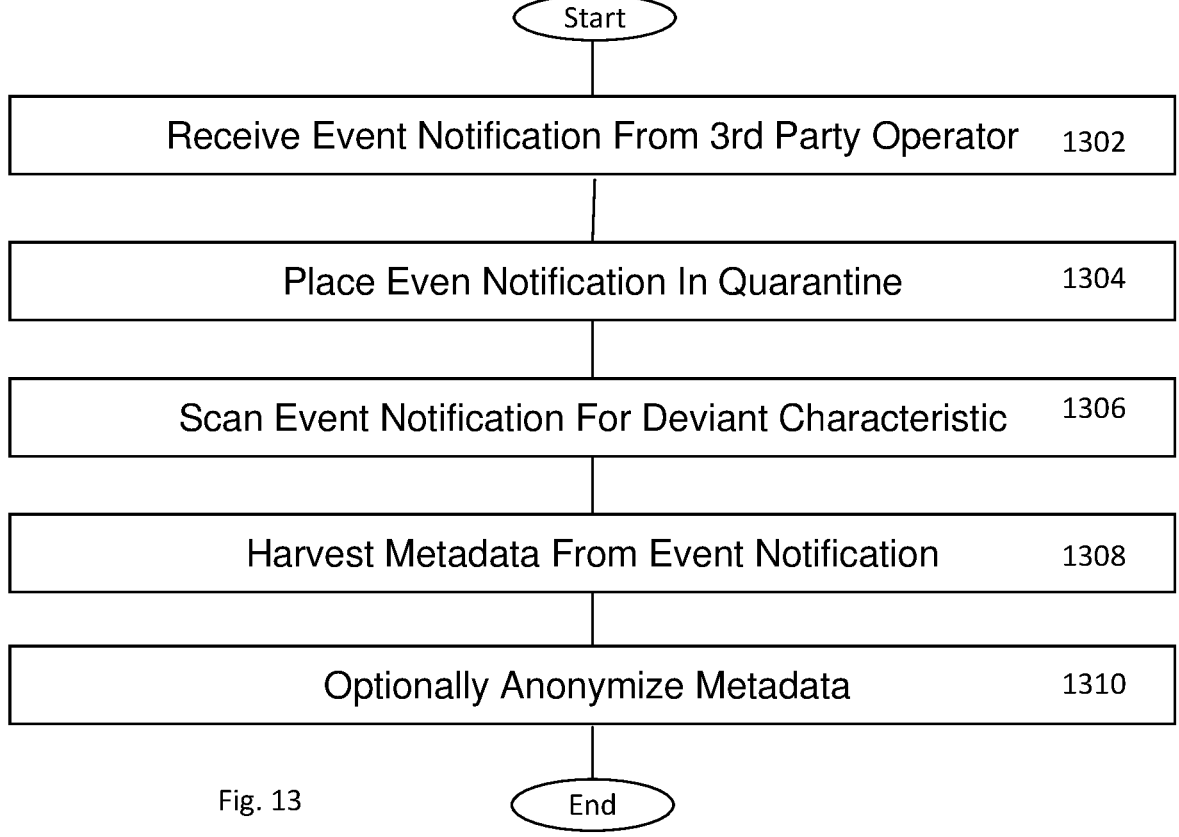
FIG. 13 illustrates a flowchart of an embodiment of a method for receiving push data from a SaaS application.

The SaaS module can receive administrative events as a push notification, with proper security precautions in place. FIG. 13 illustrates a flowchart of an embodiment of a method for receiving push data from a SaaS application. The SaaS module is configured to receive receiving an event notification from at least one connector to a third-party platform describing an administrative event of a third-party SaaS application as a push notification (Block 1302). The SaaS module is configured to place the event notification received from the at least one connector in a quarantine prior to analysis (Block 1304). The SaaS module is configured to scan the event notification while in quarantine for a deviant characteristic (Block 1306). The SaaS module is configured to harvest metadata detailing the administrative events from the event notification (Block 1308). The SaaS module is configured to optionally anonymize the metadata to remove any personally identifiable information for the third-party platform and the network entity from the metadata (Block 1310).

Figure 14:
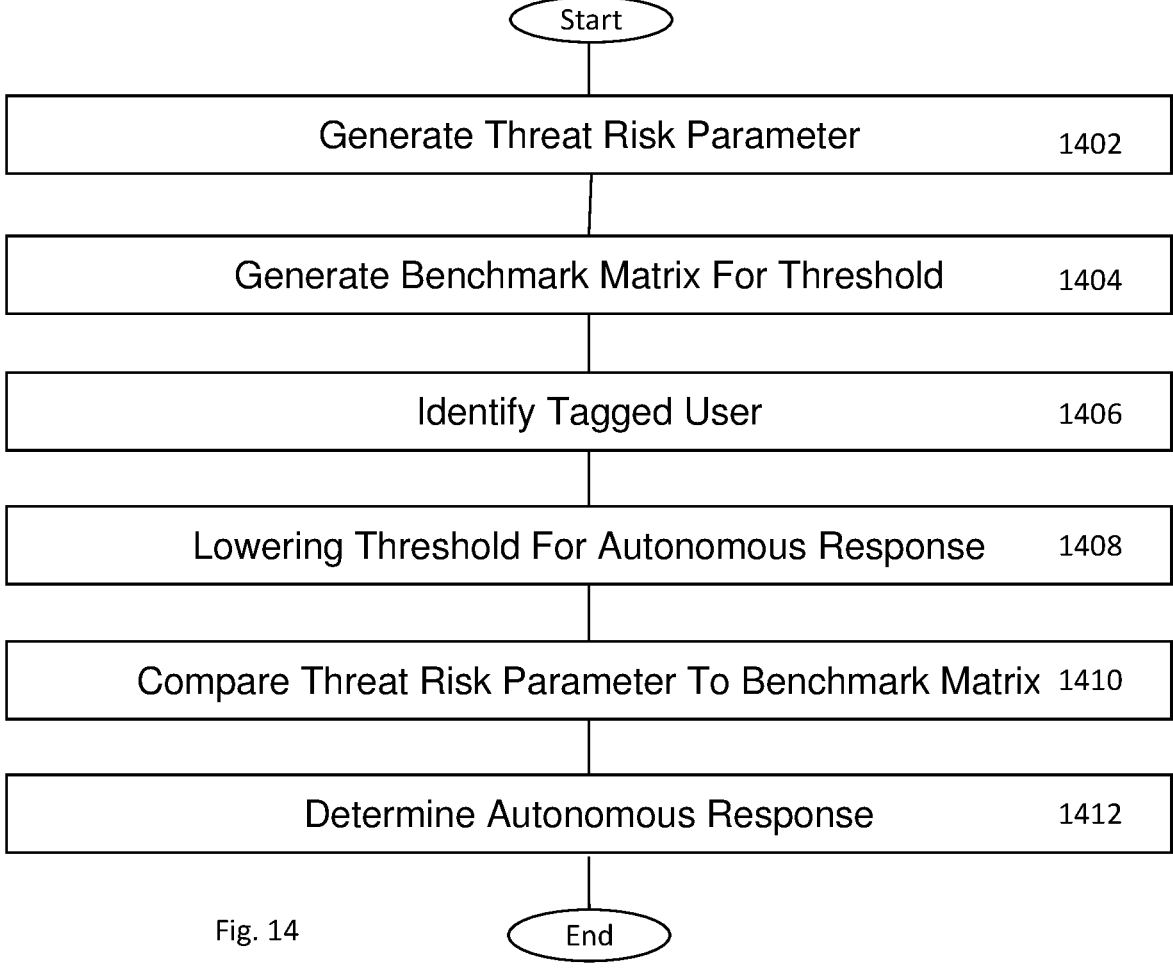
FIG. 14 illustrates a flowchart of an embodiment of a method for identifying and executing an autonomous response.

The autonomous response module can use threat risk parameter generated by the cyber threat module to autonomously determine a response. FIG. 14 illustrates a flowchart of an embodiment of a method for identifying an autonomous response. The cyber threat defense system can have the cyber threat module configured to generate a threat risk parameter listing a set of values describing aspects of the cyber threat (Block 1402). The cyber threat defense system can have the autonomous response module configured to generate a benchmark matrix having a set of benchmark scores (Block 1404). The autonomous response module can identify a tagged user associated with the cyber threat (Block 1406). The autonomous response module can lower a threshold for the autonomous response upon identifying a tagged user associated with the cyber threat (Block 1408). The autonomous response module can compare the threat risk parameter to the benchmark matrix to determine the autonomous response (Block 1410). The autonomous response module can determine an autonomous response based on the comparison (Block 1412).

The cyber threat defense system can generate a threat risk parameter to describe the relative dangers of an anomalous event. FIG. 15 illustrates a block diagram of a threat risk parameter. The threat risk parameter can have a threat type 1502 describing the type of threat identified, such as financial, administrative, information technology, production, or other. The threat risk parameter can have a confidence score 1504 indicating a breach likelihood describing a probability that the template entity is in the breach state. The threat risk parameter can have a severity score 1506 indicating a percentage that the template entity in the breach state is deviating from normal behavior, as represented by the at least one model. The threat risk parameter can have a user risk profile 1508, comprised of a user importance score and a vulnerability score, indicating a severity of damage attributable to the breach state.

Figure 16:
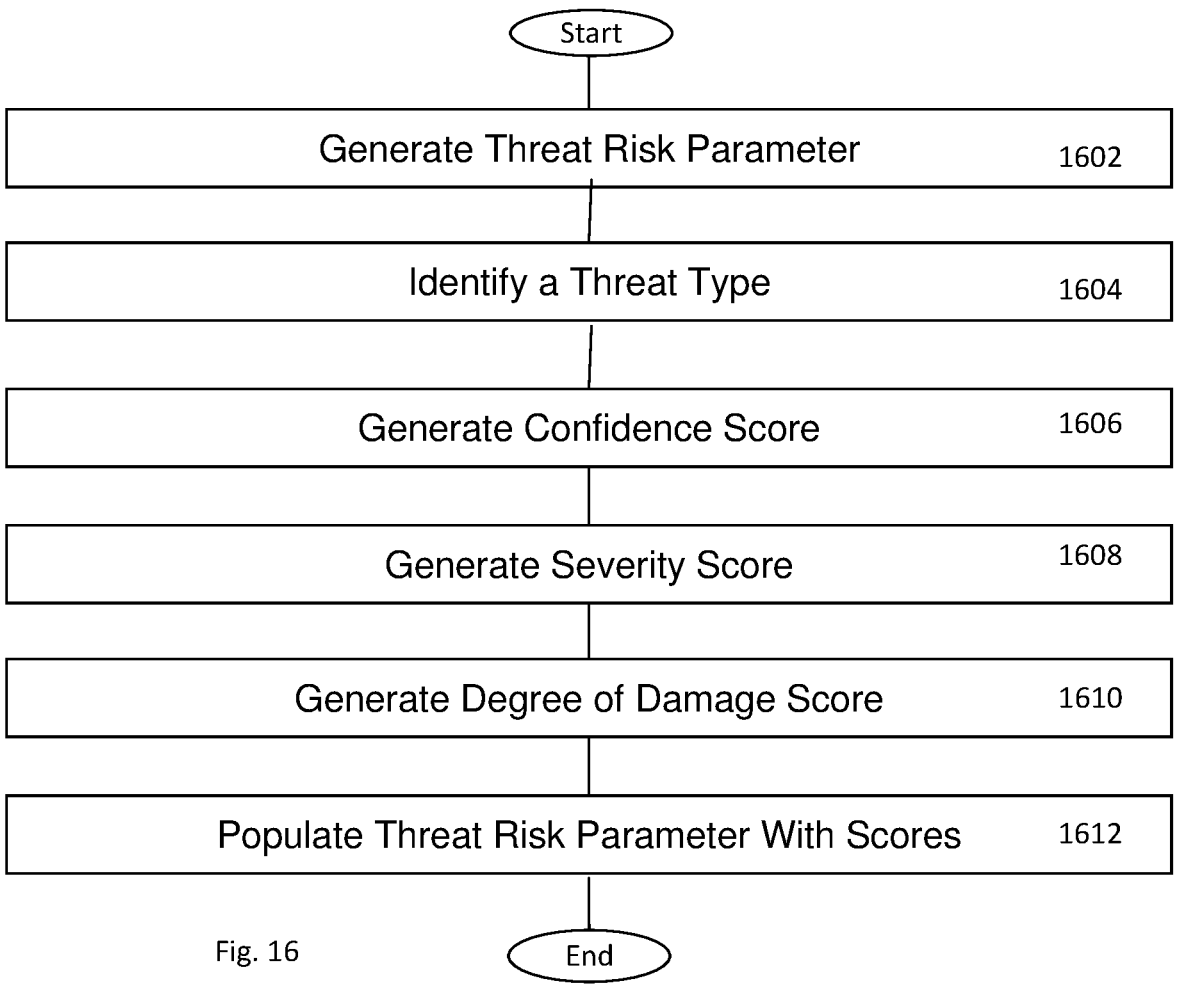
FIG. 16 illustrates a flowchart of an embodiment of a method for generating a threat risk parameter.

FIG. 16 illustrates a flowchart of an embodiment of a method for generating a threat risk parameter. The cyber threat module can generate a threat risk parameter listing a set of values describing aspects of the breach state (Block 1602). The cyber threat module can identify a threat type for the cyber threat by using a variety of clustering techniques to group the threat with other identified cyber threats (Block 1604). The cyber threat module can generate a confidence score (Block 1606). The cyber threat module can generate a severity score (Block 1608). The cyber threat module can generate a degree of damage score (Block 1610). The cyber threat module can populate the threat risk parameter with at least one of the confidence score, the severity score, and the consequence score (Block 1612).

FIG. 17 illustrates a block diagram of a benchmark matrix. The autonomous response module, in conjunction with the cyber threat module, can populate the benchmark matrix with moving benchmarks that can adapt to the changing nature of both the network and threats to the network. The benchmark matrix can have a confidence benchmark 1702 indicating a breach likelihood describing a probability above which the template entity is in the breach state. The benchmark matrix can have a severity benchmark 1704 indicating a percentage above which the template entity is in the breach state. The benchmark matrix can have a consequence benchmark 1706 indicating a severity of damage attributable to the breach state that above which immediate action is to be taken. The autonomous response module can adjust these benchmarks as more data is added and greater user input is received.

The autonomous response module can assign a weight to each bench mark score to assign a relative importance to each bench mark score to factor in a decision to send an inoculation notice. As with the benchmarks, these weights may evolve over time. For example, the benchmark matrix can have a confidence weight 1708 indicating the importance of the confidence benchmark, a severity weight 1710 indicating the importance of the severity benchmark, and a consequence weight 1712 indicating the importance of the consequence benchmark. Using these assigned weights, different deviations from the benchmarks may have a greater result on the final decision to send and inoculation notice.

Figure 18:
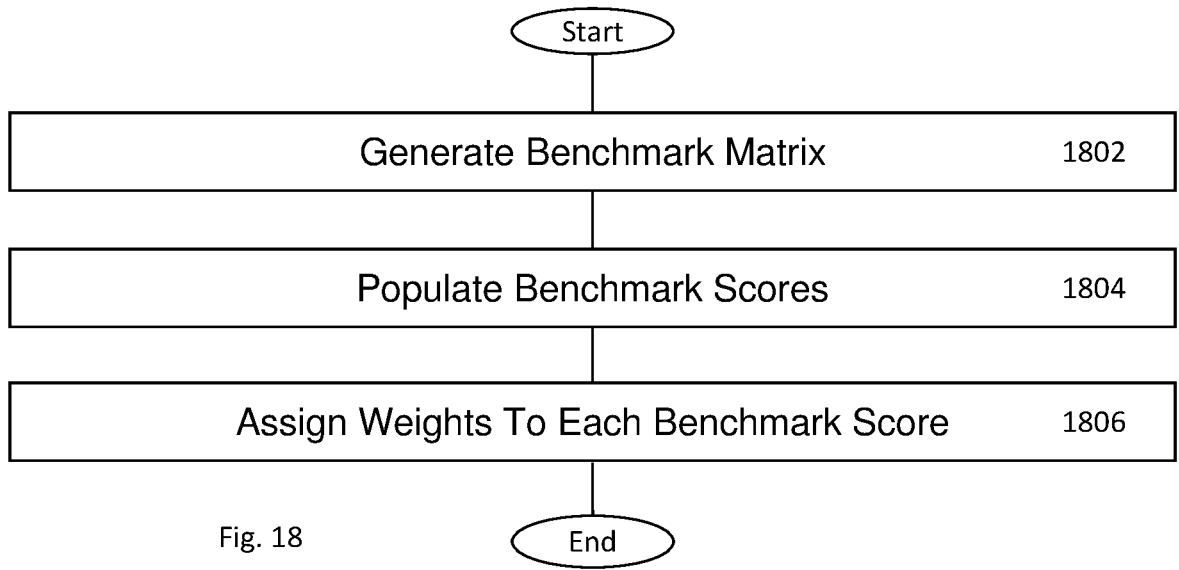
FIG. 18 illustrates a flowchart of an embodiment of a method for generating a benchmark matrix.

FIG. 18 illustrates a flowchart of an embodiment of a method for comparing analyzed input data to a benchmark to trigger an inoculation notice. The autonomous response module can generate a benchmark matrix having a set of benchmark scores to determine an autonomous response (Block 1802). The autonomous response module can populate the benchmark scores in the benchmark matrix based on data gathered during the breach identification process (Block 1804). The autonomous response module can assign a weight to each benchmark score to assign a relative importance to each benchmark score (Block 1806).

SaaS Pre-Emptive Risk Detector

The cyber threat detection platform is configured to detect low level events and then pre-emptively coordinate with potentially third-party resources to pre-emptively take actions to mitigate against a potential cyber threat in a SaaS environment. The SaaS pre-emptive risk detector identifies events that are low-level anomalous or indicate a new resource has been created, such as a new Virtual Machine. The SaaS pre-emptive risk detector automatically requests more contextual information from the third-party service about the resource, user, or action involved. The SaaS pre-emptive risk detector can then perform an analysis on the returned contextual data to decide if the anomaly level of the event should be raised and reported. Furthermore, the SaaS pre-emptive risk detector can instruct security services within the third-party, such as the Azure Virtual Machine Security Scanner, to check the new resource for vulnerabilities or other features that would make the new resource a possible threat. This pre-emptive approach secures resources before they are compromised or pose a more tangible threat. The SaaS pre-emptive risk detector can also make recommendations on how to secure the resource to the user in order to mitigate the vulnerabilities. Note, SaaS and Cloud connectors are different modules which poll third-party services for event data which can be fed into the cyber threat detection platform to improve visibility and anomaly detection. Each module currently detects anomalous events and reports them to the end user but now can also cooperate with security services within the third-party to take actions to mitigate a potential cyber threat.

Modules of a different cyber security appliances protecting different cyber domains or environments, such as SaaS, cloud, email, information technology network, industrial networks, and others, can share information to perform risk profiling. For example, the SaaS module and email module can be configured to share information to perform risk profiling for file access, location access, and other actions to determine risk for users who operate identifiably across one or more of the monitored systems.

The cyber threat detector has a risk profile module configured to be able to see, examine, and combine risk profiles from multiple different cyber protection domains or environments in a single pane of analysis displayable on a same user interface.

The SaaS pre-emptive risk detector can have one or more risk profiles for an entity, such as a worker, derived from their activity tracked in the multiple different cyber protection domains. The risk profiles incorporate amount of exposure and protections involved in that exposure to external actors (such as other email users and SaaS users), and their permissions levels in, for example, the SaaS platform. These risk profiles can also be looked at to increase that user's risk profile based on the combination of risks in the email domain and risks in the SaaS domain.

The SaaS pre-emptive risk detector can generate a composite user profile to allow a user to be profiled across multiple platforms to generate risk profiles. Cross-platform profiling can indicate users who are 'risky' based upon their exposure to external actors in emails or their permissions level within SaaS platforms. Users who are exposed to a multitude of external actors in their email communications and have access to a wide range of files internally, or who have 'high' permission levels or are members of high-level groups, can be profiled as 'risky' due to the impact their compromise by a cyber threat could have. Consequently, users who are found to be high-permissions users in the SaaS environment can trigger higher anomalies when potentially malicious emails are detected due to the impact their compromise by a cyber threat could have.

Files accessed in the SaaS environment are checked against those recently seen in email communications entering the organizations. These email communications are a classic attack vector for things like macro-enabled documents. Emails can be checked for instances of SaaS services which are not covered by the cyber security appliance monitoring the SaaS services, indicating potential 'shadow' accounts.

The SaaS pre-emptive risk detector can factor in the riskiness of the location of a SaaS account based upon known-active email threat campaigns in their geographic location. Active cyber threat campaigns can be occurring in geographic locations and by simply presence in that geographic locations can increase the risk profile.

A user interface, such as a SaaS console, can be the one plane to analyse and present these cross-platform risk profiles. An email cyber security appliance can talk to the SaaS cyber security appliance and other modules of the SaaS pre-emptive risk detector.

Additionally, the SaaS pre-emptive risk detector can track files on entry into the organization, check emails against known SaaS accounts to detect unauthorized SaaS platform usage, and compare user location as retrieved from the SaaS platform to active malicious email campaigns to increase alert scores. These implementations are not limited to a single platform. For example, the email platform could be Gmail and the SaaS platform JumpCloud. The SaaS pre-emptive risk detector can examine AWS permissions or whether the use of a Dropbox account is authorized by company or not as a factor in the risk profile.

A context aggregator can correlate the data of a single user across multiple SaaS platforms and internal platforms, such as network and email systems. The cyber threat defense system can have a user specific profile module to coordinate context data from each individual SaaS module to understand events across multiple SaaS platforms plus from other platforms, including the cyber threat defense system monitoring the network of that organization and the cyber threat defense system monitoring the email system on a specific user basis. Each SaaS module can interact with an application programming interface connector with built in intelligence, such as context sensors and virtual sensors, to both actively send requests for profiling information as well as passively receive profiling information and event data. One or more SaaS modules can connect to one or more SaaS connectors, with each SaaS module configured to collect third-party event data describing an administrative event in a given third-party SaaS application. The SaaS connectors then send the collected information back to the user specific profile module as well as the own corresponding SaaS module monitoring that particular SaaS platform, so that both profiles and event data can be cross linked to a specific user in the organization.

The SaaS pre-emptive risk detector can actively request information based on artificial intelligence supervised learning evaluating and attempting to understand an assessed risk via gathering information to fill in a big picture. The SaaS pre-emptive risk detector can have the ability to smart link across multiple platforms and use each individual part's own understanding, and potentially the intelligence of the third-party platform, to then assess the overall risk and potentially inform a human analyst to give them the better context. The SaaS pre-emptive risk detector can have a shared information environment from multiple SaaS platforms and non-SaaS platforms from many different sources to give a cyber analysis composite user profile to give a uniform big picture of the behavior of the user.

The SaaS pre-emptive risk detector can then characterize the riskiness of the user behavior to prevent or at least mitigate a cyber-attack on that user. The SaaS pre-emptive risk detector can have an intelligence layer with a set of AI classifiers to compare data or behavior from different platforms to see if they sync up. The SaaS pre-emptive risk detector can pull in user behavior and user profiles and characterize their footprint permissions and persistence from multiple SaaS platforms and non-SaaS platform to assess that user's overall risk. The SaaS pre-emptive risk detector can then factor actual detected abnormal events or behavior when calculating an overall score for the risk on a per user basis. A more riskier user profile can trigger generating a notice to a human analyst to investigate or cause autonomous action by the system with a lower amount of abnormal behavior detected compared to a user's profile with a lower risk profile.

Figure 19:
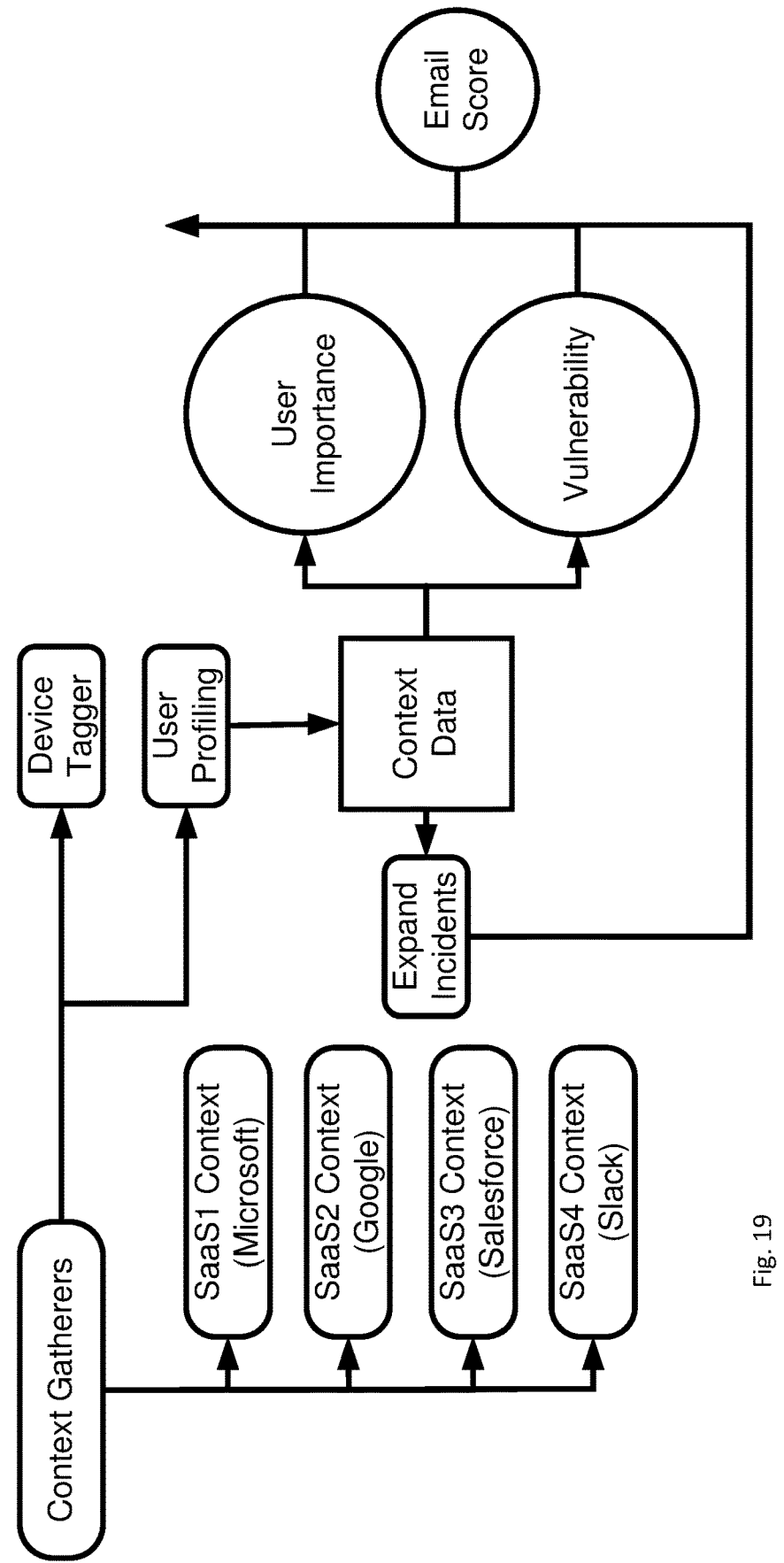
FIG. 19 illustrates in a block diagram a risk preemptor module.

FIG. 19 illustrates in a block diagram a risk preemptor module. The risk preemptor module can have a user specific profile module that uses multiple context gatherer to collect user context data from multiple SaaS applications being operated by multiple third-party platform, such as Microsoft, Google, Salesforce, Slack, or others. Each context gatherer can be tailored to the specific SaaS environment to which that context gatherer interacts. The context gatherer for the one or more SaaS modules can collect user context data from multiple third-party platforms executing SaaS applications to identify a user, which is alter used in creating a composite user profile. The context gatherer may use a device tagger to identify the device in the network used to access the SaaS application. The user specific profile module can have a user profiling module to develop a composite user profile describing the user based on the user context data from multiple SaaS applications to associate with third-party event data from the one or more SaaS modules. The user specific profile module can use the composite user profile across multiple SaaS services, even if the user has different user names for each service.

The risk preemptor module can have risk profile module that uses the context data to create an expanded incident report based on data from the SaaS module. The expanded incident report can build on an anomalous event detected in a SaaS application by identifying contributing factors to the anomalous event based on the user context data. The risk profile module can associate the expanded incident report with specific users based upon the user context data. The risk profile module can associate the user with a user risk profile based on the composite user profile.

The risk profile module can use the context data to develop a SaaS user importance score. The user importance score describes the sphere of influence of the user, or the number of resources that the user can affect and the extent to which the user can affect each resource. For example, a user with administrative privileges across multiple SaaS accounts can do a great deal of damage and would have a correspondingly high user importance score.

The risk profile module can also use the context data to develop a SaaS vulnerability score. The SaaS vulnerability score describes the extent to which a user can affect a specific SaaS resource. The risk preemptor module can receive from the email module an email score describing the likelihood of a user being subject to malicious vectors. The risk preemptor module can combine the SaaS user importance score and the SaaS vulnerability score with the expanded incident report and the email score from the email module to develop a user risk profile to determine whether an anomalous event necessitates further action.

FIG. 20 illustrates in a block diagram user context data collected from a SaaS service that may be used by the user specific profile module to develop a composite user profile. The user context data can have user name fields 2002 describing user names assigned to the user by the SaaS services. The user context data can have display name fields 2004 that SaaS services uses to interact with the user. The user context data can have a full name field 2006 for the legal name of the user stored in the SaaS service. The user context data can have a language field 2008 describing the language setting for the SaaS service. For example, the user context data may describe a user having a full name of Robert Smith, with a display name of Bob, and a user name of Robert-Smith59, and a language setting of English.

The user context data can describe the position of the user within the company. The user context data can have group fields 2010 indicating which work groups to which the user belongs. The user context data can have a job title field 2012 listing a job title for the user stored in the SaaS service. The user context data can have a roles field 2014 describing the role of the user in the SaaS service. For example, Robert Smith can be a part of the software development group with a title of team lead and a role of a system administrator.

The user context field can describe the position of the user within the company. The user context data can have license information fields 2016 describing the type of license that the user has with the SaaS service. The user context data can have application authorizations fields 2018 describing that applications that the user is authorized to use within the monitored system. The user context data can have registered devices fields 2020 describing the devices that the user has registered for use with the SaaS service. For example, Robert Smith can have a license for Microsoft 365 that authorizes him to work on Word and Excel with a laptop and a smartphone listed as registered devices.

The user context field can describe the capabilities of the user within the SaaS service. The user context data can have permissions fields 2022 describing the level of permissions that the user has with the SaaS service. The user context data can have a file access list fields 2024 describing the resources that the user has access to in the SaaS Service. For example, Robert Smith can have system admin level permissions with access to most files stored in the SaaS service.

The user context field can describe risk profiles for the user. The user context data can have click profile fields 2026 describing the tendency of the user to click on suspicious links. The user context data can have platform risk assessment fields 2028 describing an assessment by the third-party platform operator as to the dangers posed by the user. For example, Robert Smith can be considered likely to click on suspicious links, and the Microsoft 365 may consider him to be an extreme security risk.

Figure 21:
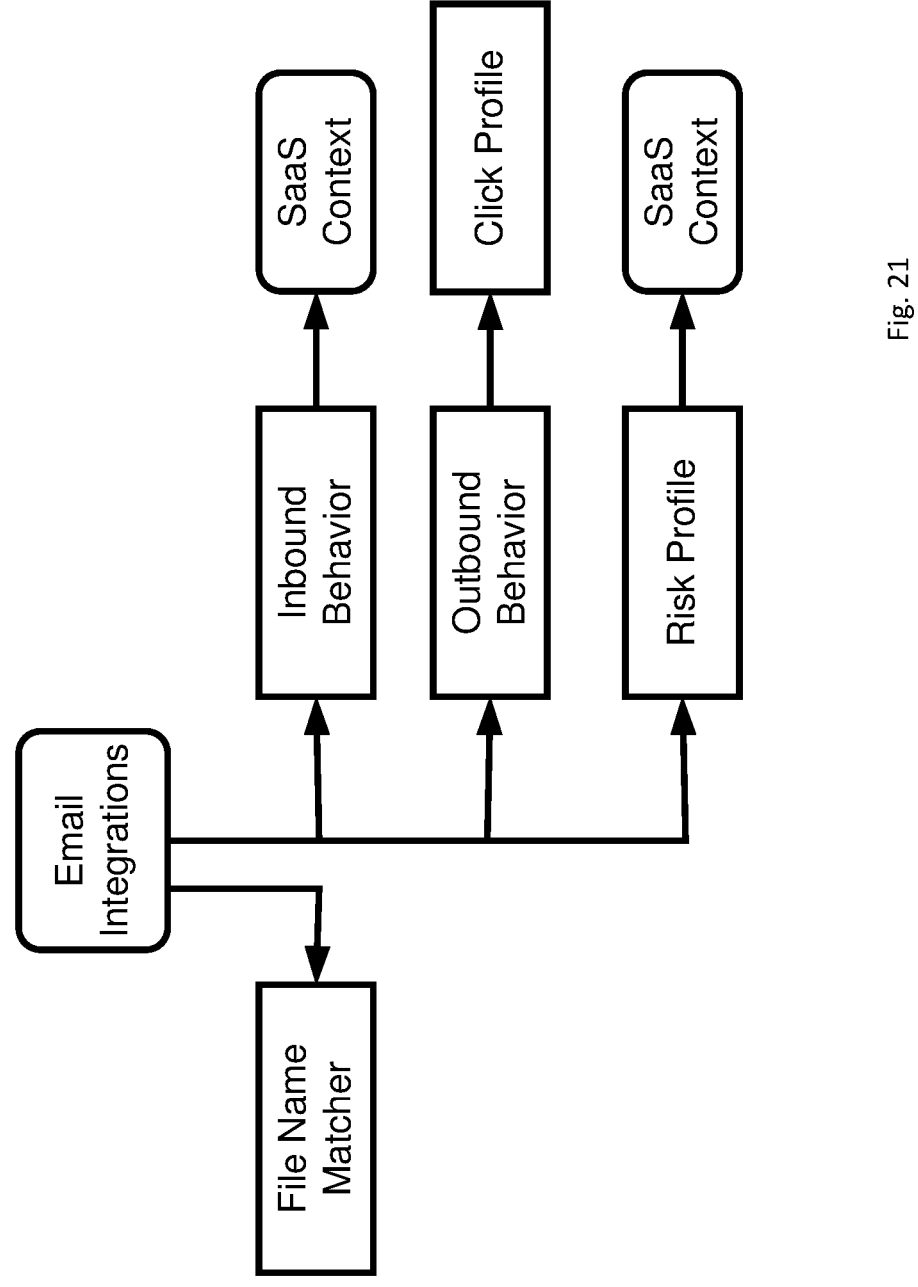
FIG. 21 illustrates in a block diagram an email integration module.

FIG. 21 illustrates in a block diagram an email module. The email module may have an email integrations module to collect user security behaviors in relation to the email system. The email integrations module may collect inbound email behavior describing how the user interacts with emails received within a SaaS service context. The email integrations module may collect outbound email behavior describing actions by the user to access data outside the SaaS service. The outbound email behavior may include a click profile describing websites accessed by the user via a link in an email. The email integrations module may collect a risk profile developed by the SaaS service describing the level of risk that the SaaS service judges the user to have. The email integrations module may use a file name matcher module to connect files received from the email service with files stored in the account of the user, allowing the user to be more readily identified.

Figure 22:
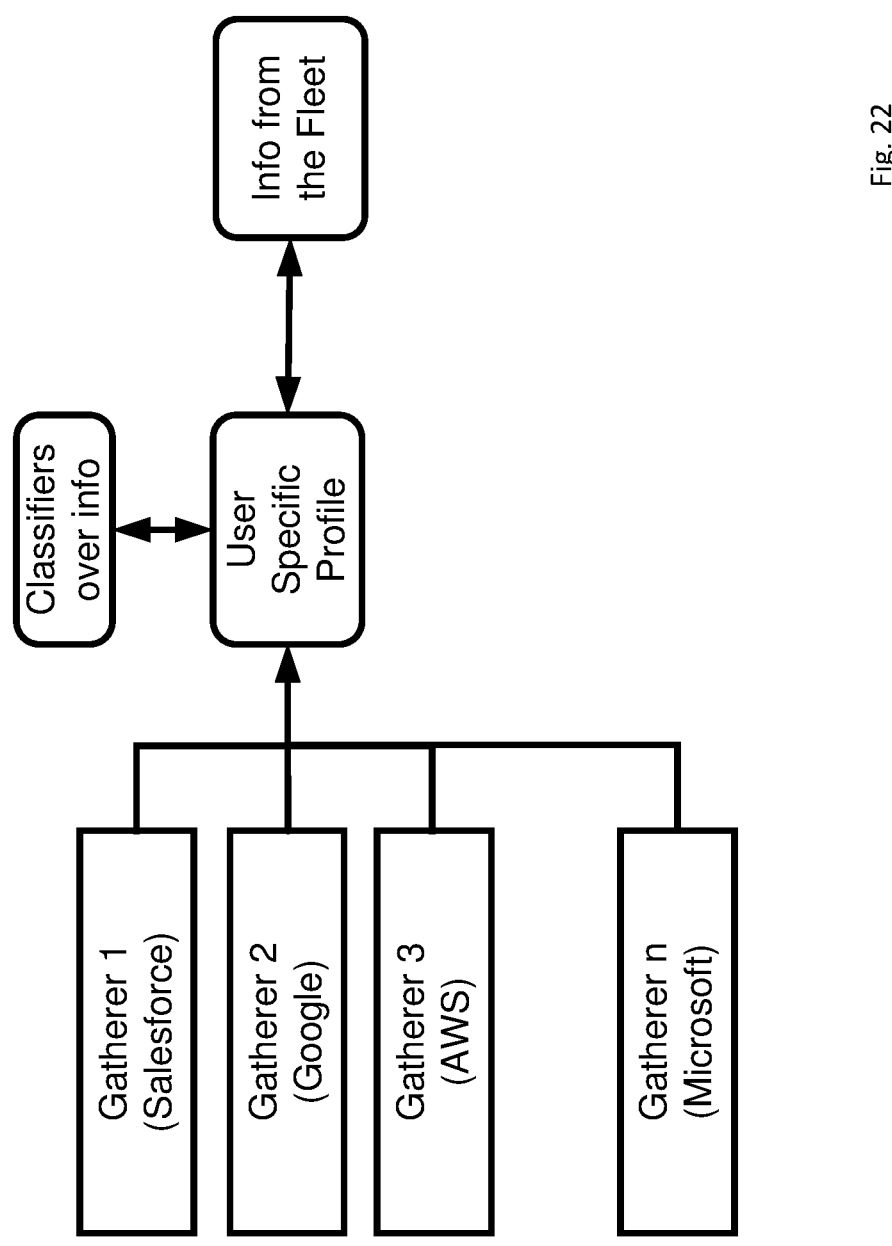
FIG. 22 illustrates in a block diagram a context aggregator.

FIG. 22 illustrates in a block diagram a user specific profile module. The user specific profile module may access multiple context gatherers collecting user context data from multiple SaaS services, such as Salesforce, Google Workspace, Amazon Web Services (AWS), or Microsoft 365. The user specific profile module may also collect user context data from the fleet of probes connected to the internal service being monitored, such as the company network. User specific profile module can use a series of artificial intelligence classifiers to establish links between user context data from different services. For example, the user specific profile module can use a fuzzy connector to connect Robert-Smith59 from Microsoft 365 with Robert. Smith. TeamLead from Salesforce.

Figure 23:
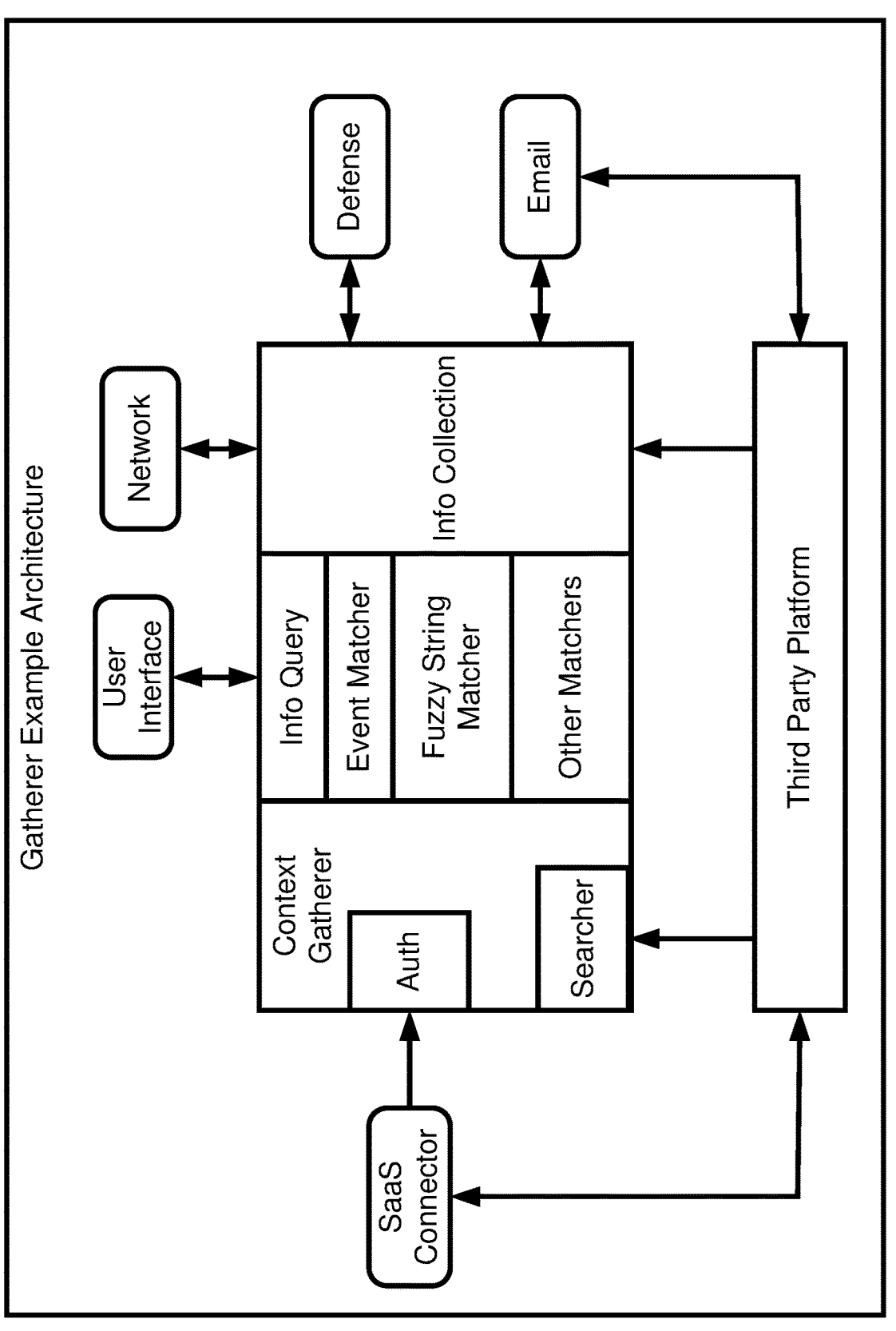
FIG. 23 illustrates in a block diagram a gatherer architecture.

FIG. 23 illustrates in a block diagram a gatherer architecture. The gatherer may have an information collection module to collect user identification and risk data from the third-party platform operating the SaaS service. The information collection module can also collect email data, cyber threat defense network data, breach data, and network data. The gatherer can have a context gatherer that connects to a SaaS connector for the third-party platform via an authorization port. The context gatherer can have a searcher sub-module that can capture vulnerability, persistence, and lateral movement data from the third-party platform. The gatherer module can use network event time device matchers, fuzzy string matchers, and other matchers to connect the collected data to the context data. The gatherer module can have an information query sub-module to provide this information to a user interface for the cyber threat defense system.

Figure 24:
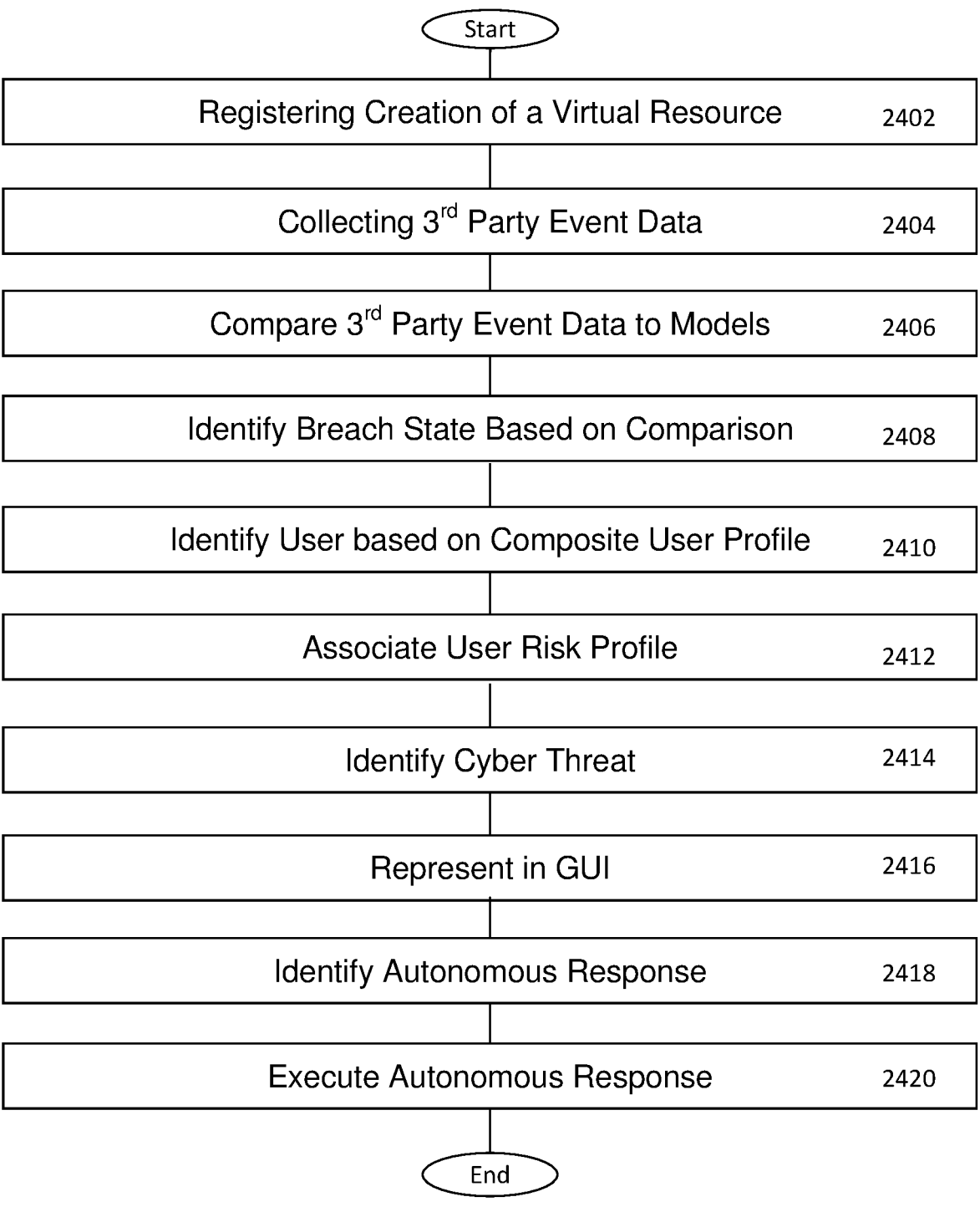
FIG. 24 illustrates a flowchart of an embodiment of a method for identifying threats across multiple third-party platforms.

FIG. 24 illustrates a flowchart of an embodiment of a method for identifying threats across multiple third-party platforms. A cyber threat defense system can have a SaaS module configured to register creation of a virtual device by the user on a third-party platform with a virtual device sensor (Block 2402). The SaaS module can collect from one or more network devices that utilizes one or more SaaS applications, third-party event data describing an administrative event of a SaaS application hosted by an associated third-party platform (Block 2404). The cyber threat defense system can have a comparison module configured to compare the third-party event data to one or more machine-learning models trained on a normal benign behavior of that network entity using a normal behavior benchmark describing parameters corresponding to a normal pattern of activity for that network entity to spot behavior on the network deviating from the normal benign behavior (Block 2406). The cyber threat defense system can identify whether the third-party event data is in a breach state of the normal behavior benchmark (Block 2408). The comparison module can also compare the combined data set created by the coordinator module, to at least one machine-learning model trained on a normal benign behavior of that network entity using a normal behavior benchmark describing parameters corresponding to a normal pattern of activity for that network entity to spot behavior on the network deviating from the normal benign behavior to identify whether the network entity is in a breach state of the normal benchmark. The cyber threat module can identify whether a breach state corresponds to a cyber threat based on the user risk profile.

The cyber threat defense system can have a user specific profile module configured to identify a user associated with the third-party event data based on a composite user profile constructed from user context data collected across the multiple SaaS applications to identify the user across multiple third-party platforms (Block 2410). The cyber threat defense system can have a risk profile module configured to associate the user with a user risk profile based on the composite user profile (Block 2412). The cyber threat defense system can have a cyber threat module configured to identify whether the third-party event data corresponds to a cyber threat based on the user risk profile (Block 2414).

The cyber threat defense system can have a user interface module configured to represent in a graphical user interface the third-party event data with a user interface module (Block 2416). The cyber threat defense system can have an autonomous response module configured to identify an autonomous response to the cyber threat using an autonomous response module (Block 2418). The autonomous response module can execute an autonomous response in response to the cyber threat using the autonomous response module factoring in the user risk profile (Block 2420). The autonomous response module can execute at least one autonomous response to a cyber threat identified by a cyber threat module, where the autonomous response factors in the user risk profile from the risk profile module.

Figure 25:
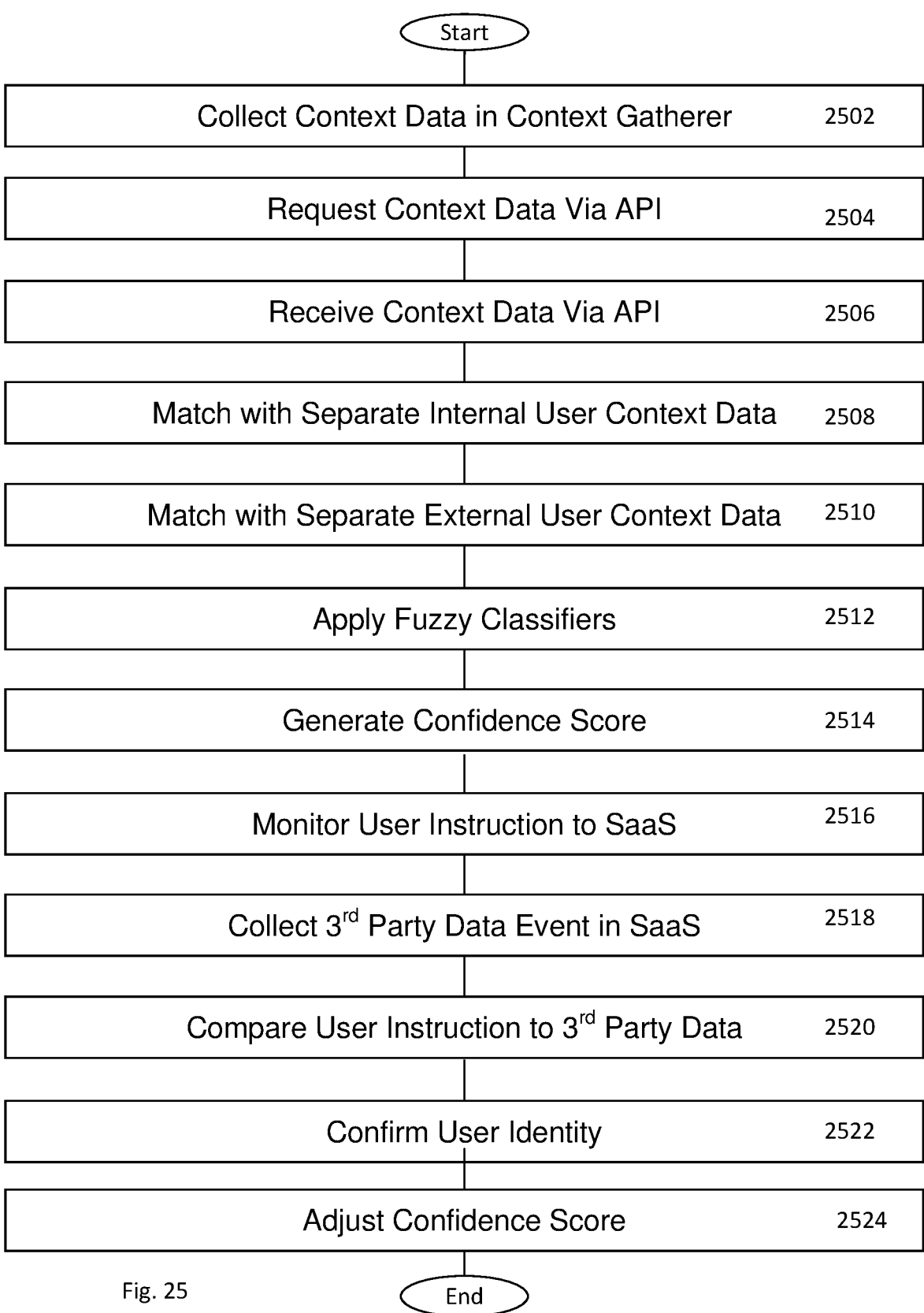
FIG. 25 illustrates a flowchart of an embodiment of a method for generating a composite user profile.

FIG. 25 illustrates a flowchart of an embodiment of a method for generating a composite user profile. A context gatherer at the SaaS module can collect user context data to identify the user from a third-party platform executing a SaaS application (Block 2502). The context gatherer can actively request the user context data from the third-party platform via an application programming interface (Block 2504). The context gatherer can receive, passively or actively, the user context data from the third-party platform via an application programming interface (Block 2506).

The user specific profile module can match the user context data from the context gatherer with separate internal user context data from other context gatherers at internal service modules associated with other applications performed by the internal client network (Block 2508). The user specific profile module can match the user context data from the context gatherer with separate external user context data from other context gatherers at other SaaS modules associated with other SaaS applications operated by other third-party platforms (Block 2510). The user specific profile module can apply a fuzzy classifier to the user context data from the context gatherer to match with separate user context data (Block 2512).

The user specific profile module can generate a confidence score for a match between the user context data from the context gatherer with separate user context data from other context gatherers at other application modules associated with other applications (Block 2514). The SaaS module can monitor a user instruction to a resource controlled by a SaaS application (Block 2516). The SaaS module can collect a third-party data event from the SaaS application (Block 2518). The user specific profile module can compare the third-party data event to the user instruction (Block 2520). The user specific profile module can confirm a user identity based on a comparison of the third-party event data to the user instruction (Block 2522). The user specific profile module can adjust the confidence score based on the third-party event data from one or more individual SaaS modules (Block 2524).

Figure 26:
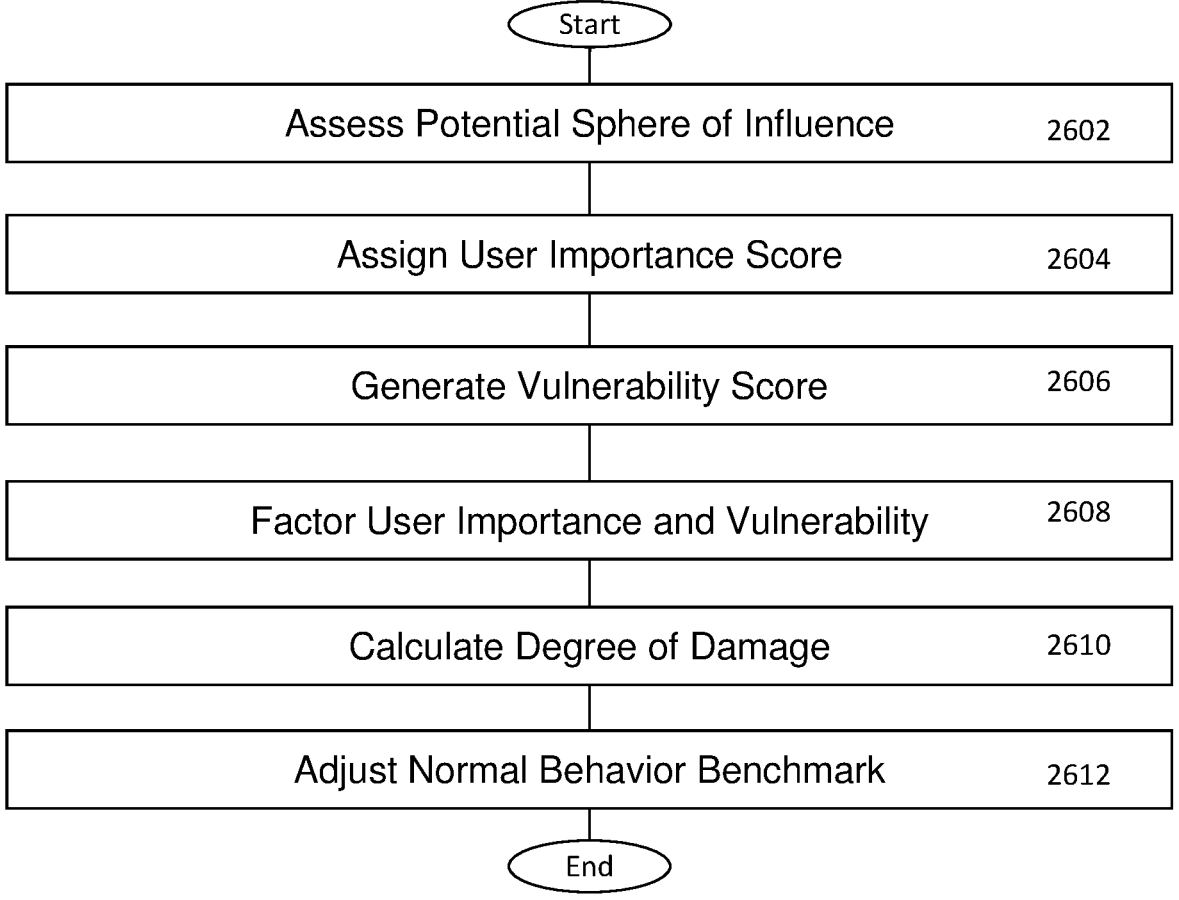
FIG. 26 illustrates a flowchart of an embodiment of a method for calculating a degree of damage score.

FIG. 26 illustrates a flowchart of an embodiment of a method for calculating a degree of damage score. The cyber threat defense system can assess the potential sphere of influence of the user based on at least one of administrative permissions, lateral movement, action persistence, and file access (Block 2602). The cyber threat defense system can assign a user importance score to the user risk profile of the user based on the composite user profile to indicate a potential sphere of influence of the user (Block 2604). The cyber threat defense system can generate a vulnerability score based on the third-party event data (Block 2606).

The cyber threat defense system can factor the user importance score and the vulnerability score into the user risk profile to calculate a degree of damage (Block 2608). The cyber threat defense system can calculate a degree of damage based on the user risk profile (Block 2610). The cyber threat defense system can adjust the normal behavior benchmark based on the user risk profile (Block 2612).

Web Site

The web site is configured as a browser-based tool or direct cooperating app tool for configuring, analyzing, and communicating with the cyber threat defense system.

Network

A number of electronic systems and devices can communicate with each other in a network environment. FIG. 27 illustrates in a simplified diagram a networked environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Similarly, functions performed by two or more modules can be combined into a single module, where logically possible. Also the functions performed by a single module can be split into two or more distinct modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a cyber threat defense system incorporating data across multiple Software-as-a-Service (SaaS) applications hosted by multiple third-party platforms to identify a cyber threat related to that SaaS application, comprising:

collecting at one or more SaaS modules, from one or more network devices that utilizes one or more SaaS applications, third-party event data describing an administrative event of a SaaS application hosted by an associated third-party platform;

identifying a user associated with the third-party event data based on a composite user profile constructed from user context data collected across the multiple SaaS applications to identify the user across multiple third-party platforms;

associating the user with a user risk profile based on the composite user profile;

identifying whether the third-party event data corresponds to a cyber threat partially based on the user risk profile;

using a user specific profile module to construct the composite user profile describing the user based on the user context data collected from multiple SaaS applications to associate with third-party event data from the one or more SaaS modules, wherein the user specific profile module applies a fuzzy classifier to the user context data from a context gatherer to match with separate user context data by generating an adjustable confidence score for a match between the user context data and the separate user context data and adjusting the confidence score based on the third-party event data from the one or more SaaS modules;

using a cyber threat module that references one or more machine learning models that are trained on a normal behavior of associated with the user and at least their SaaS activity, where the cyber threat module determines a threat risk parameter that factors in 'what is a likelihood of a chain of two or more unusual behaviors of i) SaaS activity, ii) network activity, iii) user activity and iv) any combinations of these three, under analysis, that fall outside of being the normal behavior associated with the user;' and thus, are likely malicious behavior indicative of the cyber threat; and executing an autonomous response in response to the cyber threat using an autonomous response module factoring in the user risk profile.

2. The method for the cyber threat defense system of claim 1, further comprising:

assigning a user importance score to the user risk profile of the user based on the composite user profile to indicate a potential sphere of influence of the user.

3. The method for the cyber threat defense system of claim 2, further comprising:

assessing the potential sphere of influence of the user based on at least one of administrative permissions, lateral movement, action persistence, and file access.

4. The method for the cyber threat defense system of claim 2, further comprising:

generating a vulnerability score based on the third-party event data.

5. The method for the cyber threat defense system of claim 4, further comprising:

factoring the user importance score and the vulnerability score into the user risk profile to calculate a degree of damage.

6. The method for the cyber threat defense system of claim 1, further comprising:

adjusting a normal behavior benchmark based on the user risk profile.

7. The method for the cyber threat defense system of claim 1, further comprising:

registering creation of a virtual device by the user on the third-party platform with a virtual device sensor.

8. The method for the cyber threat defense system of claim 1, further comprising:

representing in a graphical user interface the third-party event data with a user interface module.

9. The method for the cyber threat defense system of claim 1, further comprising:

collecting user context data from multiple third-party platforms executing one or more of the SaaS applications to identify the user.

10. A non-transitory computer readable medium comprising computer readable code operable, when executed by one or more processing apparatuses in the cyber threat defense system to instruct a computing device to perform the method of claim 1.

11. An apparatus for a cyber threat defense system, comprising:

a coordinator module configured to contextualize third-party event data from one or more software-as-a-service (SaaS) modules with probe data from one or more probe modules to create a combined data set for analysis;

a context gatherer for one or more SaaS modules configured to collect user context data from multiple third-party platforms executing SaaS applications to identify a user, which is used in creating a composite user profile;

a risk profile module configured to associate the user with a user risk profile based on the composite user profile;

a user specific profile module configured to construct the composite user profile describing the user based on the user context data collected from multiple SaaS applications to associate with third-party event data from the one or more SaaS modules, wherein the user specific profile module is configured to apply a fuzzy classifier to the user context data from the context gatherer to match with separate user context data by generating an adjustable confidence score for a match between the user context data and the separate user context data and adjust the confidence score based on the third-party event data from the one or more SaaS modules;

a cyber threat module that is configured to reference one or more machine learning models that are trained on a normal behavior of associated with the user and at least their SaaS activity, where the cyber threat module determines a threat risk parameter that factors in 'what is a likelihood of a chain of two or more unusual behaviors of i) SaaS activity, ii) network activity, iii) user activity and iv) any combinations of these three, under analysis that fall outside of being the normal behavior;' and thus, are likely malicious behavior indicative of a cyber threat; and an autonomous response module configured to execute at least one autonomous response to the cyber threat identified by the cyber threat module, wherein a first autonomous response factors in the user risk profile from the risk profile module.

12. The apparatus for the cyber threat defense system of claim 11, further comprising:

one or more ports to connect to one or more probes monitoring multiple network devices that utilize third-party SaaS applications each hosted by a third-party platform, wherein the one or more SaaS modules are configured to connect to one or more SaaS connectors, with each SaaS module configured to collect third-party event data describing an administrative event in a given third-party SaaS application, and wherein the context gatherer is configured to at least one of actively request and passively receive the user context data from a first third-party platform via an application programming interface;

one or more probe modules configured to collect, from the one or more probes, probe data describing network-administrated activity, external to the given third-party SaaS application, executed by the user.

13. The apparatus for the cyber threat defense system of claim 11, further comprising:

where the cyber threat module is further configured to identify whether a breach state corresponds to the cyber threat based on the user risk profile.

14. The apparatus for the cyber threat defense system of claim 13, wherein the user specific profile module is configured to match the user context data from the context gatherer with separate internal user context data from other context gatherers at internal service modules associated with other applications.

15. The apparatus for the cyber threat defense system of claim 13, wherein the user specific profile module is configured to match the user context data from the context gatherer with separate external user context data from a second context gatherer for a second SaaS module associated with a second SaaS application.

16. The apparatus for the cyber threat defense system of claim 13, wherein the user specific profile module is configured to generate a confidence score for a match between the user context data from the context gatherer with separate user context data from another context gatherer for an application module associated with another application.

17. The apparatus for the cyber threat defense system of claim 16, wherein the user specific profile module is configured to adjust the confidence score based on the third-party event data from one or more individual SaaS modules.

18. The apparatus for the cyber threat defense system of claim 11, wherein the user context data includes at least one of a user name, a display name, a full name, a language setting, work group, a job title, a role, license information, an authorized application, a registered device, a permissions level, a file access list, a click profile describing tendency to click on suspicious links, and a platform user risk assessment performed on the user by a third-party platform operator.

19. The apparatus for the cyber threat defense system of claim 11, wherein a first SaaS module is configured to monitor a user instruction to a resource controlled by a SaaS application and the user specific profile module is configured to confirm a user identity based on a comparison of the third-party event data to the user instruction.

* * * * *